US012793386B2

(12) United States Patent
Hügle

(10) Patent No.: US 12,793,386 B2
(45) Date of Patent: Nov. 10, 2026

(54) IMAGE ANALYSIS FOR AUTOMATED MONITORING OF SWELLING AND/OR ATROPHY OF BODY PARTS

(71) Applicant: UNIVERSITÉ DE LAUSANNE, Lausanne (CH)

(72) Inventor: Thomas Hügle, Lausanne (CH)

(73) Assignee: UNIVERSITÉ DE LAUSANNE, Lausanne (CH)

( * ) Notice: Subject to any disclaimer, the term of this patent is extended or adjusted under 35 U.S.C. 154(b) by 212 days.

(21) Appl. No.: 18/574,863

(22) PCT Filed: Jun. 29, 2022

(86) PCT No.: PCT/EP2022/068006
§ 371 (c)(1),
(2) Date: Dec. 28, 2023

(87) PCT Pub. No.: WO2023/275214
PCT Pub. Date: Jan. 5, 2023

(65) Prior Publication Data

US 2024/0303968 A1 Sep. 12, 2024

(30) Foreign Application Priority Data

Jun. 29, 2021 (EP) .................................... 21182613
Dec. 20, 2021 (EP) .................................... 21216138

(51) Int. Cl.
*G06V 10/764* (2022.01)
*G06T 7/13* (2017.01)
*G06V 40/10* (2022.01)

(52) U.S. Cl.
CPC .............. *G06V 10/764* (2022.01); *G06T 7/13* (2017.01); *G06V 40/107* (2022.01); *G06T 2207/20044* (2013.01)

(58) Field of Classification Search
CPC ........ G06V 10/10; G06V 10/20; G06V 10/40; G06V 10/70; G06V 20/10; G06V 20/50;
(Continued)

(56) References Cited

U.S. PATENT DOCUMENTS 10,607,362 B2 * 3/2020 Kraft .................. G06F 18/2135
2013/0218582 A1 * 8/2013 LaLonde ............... A61B 7/003
600/324

(Continued)

FOREIGN PATENT DOCUMENTS

WO 2021030868 A1 2/2021

OTHER PUBLICATIONS

Snekhalatha Umapathy et al., "Computer Aided Diagnosis Based Hand Thermal Image Analysis:A Potential Tool for the Evaluation of Rheumatoid Arthritis," Sep. 30, 2017, J. Med. Biol. Eng. (2018) 38,pp. 666-674.*

(Continued)

*Primary Examiner* — Omar S Ismail
(74) *Attorney, Agent, or Firm* — KDW Firm PLLC

(57) ABSTRACT

The invention relates to a method for determining a parameter indicative of the degree of swelling, atrophy and/or fibrosis of a body part of a subject and/or a method for determining a score indicative of the state of arthritis, scleroderma and/or Raynaud's phenomenon from an image of a body part. The invention further relates to a pharmaceutical composition for use in the treatment of arthritis, scleroderma and/or Raynaud's phenomenon in a subject, wherein the subject has a score indicative for an active state of arthritis, scleroderma and/or Raynaud's phenomenon determined according to method of the invention. The invention also relates to a library of a parameter indicative of the degree of swelling atrophy and/or fibrosis determined according to the method of the invention or of a score
(Continued)

indicative of the state of arthritis, scleroderma and/or Raynaud's phenomenon determined according to the method of the invention.

31 Claims, 12 Drawing Sheets

(58) Field of Classification Search

CPC ........ G06V 20/60; G06V 30/10; G06V 30/40; G06V 40/10; G06V 40/12; G06V 40/14; G06V 40/18; G06V 30/41; G06V 30/42; G06V 30/14; G06V 30/16; G06V 30/18; G06V 30/19; G06V 30/24; G06V 30/26; G06V 30/30; G06V 20/56; G06V 20/52; G06V 10/12; G06V 10/42; G06V 10/74; G06V 10/77

See application file for complete search history.

(56) References Cited

U.S. PATENT DOCUMENTS

| | | | | |
|---|---|---|---|---|
| 2014/0163375 | A1* | 6/2014 | Wasielewski | A61B 8/0875 600/443 |
| 2016/0030281 | A1* | 2/2016 | Shafieloo | A61H 23/0245 601/48 |
| 2016/0180024 | A1* | 6/2016 | Basavaraj | G16H 30/20 705/3 |
| 2016/0331460 | A1* | 11/2016 | Cheatham, III | A61B 46/00 |
| 2016/0334864 | A1* | 11/2016 | Cheatham, III | A61B 90/37 |
| 2017/0036066 | A1* | 2/2017 | Chahine | A41D 1/002 |
| 2017/0213437 | A1* | 7/2017 | Sundaram | A61B 5/107 |
| 2017/0216078 | A1* | 8/2017 | Rivlin | A61F 5/05866 |
| 2017/0258995 | A1* | 9/2017 | Hyde | A61M 35/10 |
| 2018/0182091 | A1* | 6/2018 | Mackinnon | A61B 5/0077 |
| 2020/0170564 | A1* | 6/2020 | Jiang | A61B 5/0077 |
| 2020/0193597 | A1* | 6/2020 | Fan | A61B 5/0075 |
| 2020/0237291 | A1* | 7/2020 | Sundaram | A61B 5/4528 |
| 2021/0069390 | A1* | 3/2021 | Gross | A61B 5/0077 |
| 2021/0228276 | A1* | 7/2021 | Giraldez | G09B 1/00 |
| 2023/0148951 | A1* | 5/2023 | Thatcher | A61B 5/7275 382/128 |
| 2023/0222654 | A1* | 7/2023 | Fan | A61B 5/0075 382/128 |

OTHER PUBLICATIONS

Ariane L. Herrick et al. ,"New perspectives in the imaging of Raynaud's phenomenon," Jul. 6, 2020, European Journal of Rheumatology, 2020,S212-S218.*

Chiara Filippini et al.,"Convolutional Neural Networks for Differential Diagnosis of Raynaud's Phenomenon Based on Hands Thermal Patterns," Apr. 16, 2021, Applied Sciences,2021, 11, 3614,pp. 1-7.*

Nathalie Boutry wt al.,"Imaging features of musculoskeletal involvement in systemic sclerosis," Sep. 23, 2006, Eur Radiol (2007) 17,pp. 1173-1177.*

John D Pauling et al.,"Raynaud's phenomenon—an update on diagnosis, classification and management," Aug. 16, 2019, Clinical Rheumatology (2019) 38:, pp. 3317-3325.*

Farhad Akhbardeh et al., "Classification and Assessment of Hand Arthritis Stage using Support Vector Machine," Oct. 7, 2019, 2019 41st Annual International Conference of the IEEE Engineering in Medicine and Biology Society (EMBC), pp. 4080-4082.*

International Search Report and Written Opinion for International Application No. PCT/EP2022/068006, filed on Jun. 29, 2022, 12 pages.

Farhad Akhbardeh et al., "Classification and Assessment of Hand Arthritis Stage using Support Vector Machine," 2019 41st Annual International Conference of the IEEE Engineering in Medicine and Biology Society (EMBC), 10.1109/EMBC.2019.8857022, Jul. 2019, 4 pages.

* cited by examiner

IMAGE ANALYSIS FOR AUTOMATED MONITORING OF SWELLING AND/OR ATROPHY OF BODY PARTS

This application is a national stage application in the U.S. filed under 35 U.S.C. § 371 of pending international application no. PCT/EP2022/068006 filed 29 Jun. 2022, which claims priority to European Patent Application Serial No. EP 21182613.6, filed 29 Jun. 2021, and European Patent Application Serial No. EP 21216138.4 filed 20 Dec. 2021, the entireties of which applications are hereby incorporated by reference herein.

The invention relates to a method for determining a parameter indicative of the degree of swelling, atrophy and/or fibrosis of a body part of a subject and/or a method for determining a score indicative of the state of arthritis, scleroderma and/or Raynaud's phenomenon from an image of a body part. The invention further relates to a pharmaceutical composition for use in the treatment of arthritis, scleroderma and/or Raynaud's phenomenon in a subject, wherein the subject has a score indicative for an active state of arthritis, scleroderma and/or Raynaud's phenomenon determined according to method of the invention. The invention also relates to a library of a parameter indicative of the degree of swelling atrophy and/or fibrosis determined according to the method of the invention or of a score indicative of the state of arthritis, scleroderma and/or Raynaud's phenomenon determined according to the method of the invention.

Joint swelling due to synovitis and joint effusion is a key symptom of inflammatory arthritis. Rheumatoid arthritis is a main cause of arthritis and affects around 1% of the population. Other causes of arthritis are psoriasis arthritis and spondylarthritis. Osteoarthritis, which is considered as a degenerative disease, leads to synovitis in up to 50% and therefore also leads to joint swelling. To measure the activity of arthritis it is essential to assess the efficacy of the current treatment and predict treatment amendments. Currently, disease activity of arthritis is assessed by the following methods: 1. Patient-reported symptoms such as pain, swelling or stiffness, 2. clinical examination for joint swelling or redness, 3. Imaging by ultrasound examination or if necessary magnetic resonance, or 4. blood tests (CRP, sedimentation rate). There are several validated scores for disease activity such as the DAS28-CRP score in rheumatoid arthritis. The DAS28-CRP score is composed of the swollen and tender joint score, CRP, and global assessment of disease activity both by the patient and healthcare professional. Pain and joint stiffness are subjective and vague indicators that are influenced by other factors e.g. depression or fibromyalgia. Joint swelling assessment requires a rheumatologist and quantification has proven difficult to standardize. Blood tests and ultrasound imaging is invasive and time-consuming for the patient and doctor, respectively can be biased e.g. by vascular dysfunction.

Therefore, there is a need for less resource intense, non-invasive methods to detect and quantify swelling, atrophy and/or fibrosis.

The above technical problem is solved by the embodiments disclosed herein and as defined in the claims.

Accordingly, the invention relates to, inter alia, the following embodiments:

1. A method for determining a parameter indicative of the degree of swelling, fibrosis and/or atrophy of a body part of a subject, the method comprising the steps of:

(I) retrieving an image of a body part of a subject, wherein the body part is capable of swelling and/or atrophy;
   (II) determining the contrast of shadows on the skin of the body part on the image and/or the edge line of the body part on the image; and
   (III) classifying the contrast of shadow on the skin of the body part on the image and/or the edge line of the body part on the image of step (II) to determine the parameter indicative of the degree of swelling, fibrosis and/or atrophy from the image.
2. The method according to embodiment 1, wherein the contrast of shadow on the skin of the body part on the image comprises level of contrast, width of contrast lines, length of contrast lines, angle of contrast lines and/or distance between contrast lines.
3. The method according to embodiment 1 or 2, wherein the determination of the parameter indicative of the degree of swelling, fibrosis and/or atrophy from the image is further based on a clinical parameter of the subject.
4. The method according to embodiment 4, wherein clinical parameter is at least one parameter selected from the group of age, gender, form of arthritis, grade of arthritis, form of scleroderma, grade of scleroderma, grade of Raynaud's phenomenon, type of Raynaud's phenomenon, body size, body weight, and skin color.
5. A method for determining a score indicative of the state of arthritis, scleroderma and/or Raynaud's phenomenon from an image of a body part, wherein the method comprises the steps of:
   (i) determining from the image a parameter indicative of the degree of swelling, fibrosis and/or atrophy according to any of the embodiments 1 to 4,
   (ii) comparing the parameter determined in (i) to a reference parameter; and
   (iii) identifying a score indicative of the state of arthritis based on the comparison in step (ii), in particular, wherein the score is indicative for an active state of arthritis, scleroderma and/or Raynaud's phenomenon if the parameter determined in (i) is above the reference parameter in step (ii).
6. A pharmaceutical composition for use in the treatment of arthritis in a subject, wherein the subject has a score indicative for an active state of arthritis determined according to the method of embodiment 5.
7. The method of embodiment 5, or the pharmaceutical composition for use of embodiment 6, wherein the reference parameter is a parameter
   (a) obtained from prior analysis of said subject, or
   (b) obtained from at least two reference subjects, wherein the at least one reference subject is not suffering from arthritis scleroderma and/or Raynaud's phenomenon, and/or from swelling, fibrosis and/or atrophy of the body part, and at least one reference subject is suffering from arthritis scleroderma and/or Raynaud's phenomenon and/or from swelling, fibrosis and/or atrophy of the body part.
8. The method of embodiment 5 or 7, or the pharmaceutical composition for use of embodiment 6 or 7, wherein a decrease of the parameter compared to the reference parameter indicates that arthritis, scleroderma and/or Raynaud's phenomenon deteriorates, wherein an increase of the parameter compared to the reference parameter indicates that arthritis, scleroderma and/or Raynaud's phenomenon ameliorates, or wherein an identical parameter compared to the reference parameter indicates that arthritis, scleroderma and/or Raynaud's phenomenon halts.

9. The method of any one of embodiments 5, 7, and 8, or the pharmaceutical composition for use of any one of embodiments 6 to 8, wherein the reference parameter is a library of reference parameters, preferably wherein the library is generated by machine learning, more preferably wherein the library is generated by a technique selected from the group of deep learning, convolutional networks, decision trees, and fuzzy nets.
10. The method of any one of embodiments 5, 7 to 9, or the pharmaceutical composition for use of any one of embodiments 6 to 9, wherein the comparison step comprises automated feature learning and classification steps.
11. The method of any one of embodiments 5, 7 to 10, or the pharmaceutical composition for use of any one of embodiments 6 to 10, wherein the state of arthritis comprises an inflammation grade and/or synovitis grade.
12. The method of any one of embodiments 1 to 5, 7 to 11, or the pharmaceutical composition for use of any one of embodiments 6 to 11, wherein the body part is a hand and/or a foot of a subject.
13. The method of embodiment 12 or the pharmaceutical composition for use of embodiment 12, wherein the body part is a hand of the subject.
14. The method of any one of embodiments 1 to 5, 7 to 13, or the pharmaceutical composition for use of any one of embodiments 6 to 13, wherein the body part comprises a proximal interphalangeal joint, an extensor tendon, a metacarpophalangeal joint, and/or a distal interphalangeal joint.
15. The method of any one of embodiments 1 to 5, 7 to 14, or the pharmaceutical composition for use of any one of embodiments 6 to 14, wherein the body part comprises dorsal finger skin folds of the proximal interphalangeal joint, a skin fold of the extensor tendon, and/or the metacarpophalangeal joints.
16. The method of any one of embodiments 1 to 5, 7 to 15, or the pharmaceutical composition for use of any one of embodiments 6 to 15, wherein the parameter is the shape of the skin folds, the contrast of the skin folds, the number of the skin folds, the length or thickness of the skin folds, the angle of skin folds, the distance between skin folds and/or the contour of the body part.
17. The method of any one of embodiments 1 to 5, 7 to 16, or the pharmaceutical composition for use of any one of embodiments 6 to 16, wherein the parameter is
    (a) the edge line of the dorsal finger skin folds of the proximal interphalangeal joint,
    (b) the contrast of shadow of the dorsal finger skin folds of the proximal interphalangeal joint,
    (c) the contrast of the shadow of extensor tendon, and/or
    (d) the contour of the metacarpophalangeal relief.
18. The method of any one of embodiments 1 to 5, 7 to 17, or the pharmaceutical composition for use of any one of embodiments 6 to 17, wherein the parameter indicates whether arthritis ameliorates, halts, or deteriorates.
19. The method of any one of embodiments 1 to 5, 7 to 18, or the pharmaceutical composition for use of any one of embodiments 6 to 18, wherein the edge line of the dorsal finger skin folds of the proximal interphalangeal joint, the contrast of the shadow of dorsal finger skin folds of the proximal interphalangeal joint, the contrast of shadow of the extensor tendon, and/or the contour of the metacarpophalangeal relief is/are determined.

20. The method of any one of embodiments 5, 7 to 19, or the pharmaceutical composition for use of any one of embodiments 6 to 19, wherein the arthritis is selected from the group consisting of osteoarthritis, rheumatoid arthritis, gout, pseudo-gout, septic arthritis, psoriasis arthritis, spondyloarthritis, juvenile idiopathic arthritis, crystal-associated arthritis and still's disease, preferably wherein the arthritis is rheumatoid arthritis.
21. The method of any one of embodiments 5, 7 to 20, or the pharmaceutical composition for use of any one of embodiments 6 to 20, wherein the body part is the distal interphalangeal joint, and wherein the arthritis is osteoarthritis.
22. The method of any one of embodiments 1 to 5 and 7 to 21, wherein the method further comprises obtaining the image of the body part.
23. The method of any one of embodiments 1 to 5 and 7 to 22, or the pharmaceutical composition for use of any one of embodiments 6 to 21, wherein the image is or was obtained by optical imaging, preferably using light as a source of light, wherein preferably the light is visible light.
24. The method of any one of embodiments 1 to 5, 7 to 23, or the pharmaceutical composition for use of any one of embodiments 6 to 21, 23, wherein the image is or was obtained by a camera.
25. The method of any one of embodiments 1 to 5, 7 to 24, or the pharmaceutical composition for use of any one of embodiments 6 to 11, 23, 24, wherein obtaining the image comprises using augmented reality or wherein the image was obtained by using augmented reality.
26. The method of any one of embodiments 5, 7 to 25, wherein the method further comprises administering to the subject having a score indicative for an active state of arthritis, scleroderma and/or Raynaud's phenomenon a pharmaceutically effective amount of a pharmaceutical composition for the treatment of the respective disease.
27. A library of a parameter indicative of the degree of swelling, fibrosis and/or atrophy determined according to the method of embodiment 1 to 4, 12 to 25 or of a score indicative of the state of arthritis, scleroderma and/or Raynaud's phenomenon determined according to the method of embodiment 5, 7 to 26.
28. A storage device comprising computer-readable program instructions for executing the method according to embodiment 1 to 5, 7 to 25.
29. A system for determining a parameter indicative of the degree of swelling, fibrosis and/or atrophy determined according to the method of embodiment 1 to 4, 12 to 25 or for determining a score indicative of the state of arthritis, scleroderma and/or Raynaud's phenomenon determined according to the method of embodiment 5, 7 to 26 comprising the storage device according to embodiment 28; at least one processing device and a capturing device.
30. A server comprising the storage device of embodiment 29, at least one processing device, and a network connection for receiving data indicative of an image of a body part.
31. The method of any one of embodiments 5, 7 to 26, wherein the score is indicative of the state of arthritis and wherein the parameter is at least indicative of the degree of swelling, preferably wherein the parameter is indicative of the degree of swelling.

32. The method of any one of embodiments 5, 7 to 26, wherein the score is indicative of the state of scleroderma.

33. The method of any one of embodiments 5, 7 to 26, wherein the score is indicative of the state of Raynaud's phenomenon.

34. A method for determining a score indicative of the the likelihood of a subject of having arthritis, scleroderma or Raynaud's phenomenon from an image of a body part, wherein the method comprises the steps of:
   (i) determining from an image of a body part of a subject a parameter indicative of the degree of swelling, fibrosis and/or atrophy according to any one of the embodiments 1 to 4,
   (ii) comparing the parameter determined in (i) to a distinguishing reference pattern, wherein the distinguishing reference pattern is obtained from at least three reference subjects, wherein at least one reference subject has arthritis, at least one reference subject has scleroderma and at least one reference subject has Raynaud's phenomenon; and
   (iii) identifying a score indicative of the likelihood of the subject of having arthritis, scleroderma or Raynaud's phenomenon based on the comparison in step (ii).

Accordingly, the invention relates to a method for determining a parameter indicative of the degree of swelling, atrophy and/or fibrosis of a body part of a subject, the method comprising the steps of: (I) retrieving an image of a body part of a subject, wherein the body part is capable of swelling, atrophy and/or fibrosis; (II) determining the contrast of the body part and/or the shape of the body part on the image; and (III) classifying the shape and/or contrast of step (II) to determine the parameter indicative of the degree of swelling, atrophy and/or fibrosis from the image.

The term "swelling", as used herein, refers to expanding the volume of a body part. In some embodiments, the swelling described herein co-occurs with pain, in particular joint pain. In some embodiments, the swelling described herein co-occurs joint effusion. In some embodiments, the swelling described herein co-occurs with increased fluid on in the peri-articular soft tissue. In some embodiments, the swelling described herein co-occurs with stiffness and/or reduced flexibility, in particular reduced joint flexibility. In some embodiments, the swelling described herein co-occurs with a tenderness of the body part, e.g., with a tenderness of the swollen part of the joint. In some embodiments, the swelling described herein is dactylitis.

In some embodiments, the swelling described herein co-occurs with a warming of the body part. In some embodiments, the swelling described herein is caused by synovitis. In some embodiments, the swelling described herein is caused by bone hypertrophy. In some embodiments, the swelling described herein is caused by synovitis and hypertrophy. In some embodiments, the swelling described herein is caused by edema. In some embodiments, the swelling described herein is caused by an infection.

The term "atrophy", as used herein, refers to a regression of the volume of a body part. Atrophy may be understood as "negative swelling" in the context of the invention. Skin folds and joint diameter typically decrease with atrophy or dystrophy. Further patterns of atrophy can be identified e.g. by machine learning. Atrophy can have different causes including skin and soft tissue fibrosis or vascular deterioration seen in disease such as systemic sclerosis (or scleroderma), Raynaud's phenomenon or Complex Regional Pain Syndrome (CRPS). Skin folds typically decrease during atrophy with or without a substantial change in the shape of the body part. In the hands, this can occur in sclerodactyly (scleroderma of the hands). Further patterns of fibrosis can be identified e.g. by machine learning. In some embodiments, the combination of the terms "swelling, atrophy and/or fibrosis" as used herein is to be understood as "swelling and/or atrophy". In some embodiments, the combination of the terms "swelling, atrophy and/or fibrosis" as used herein is to be understood as "swelling".

The term "body part", as used herein, refers to any anatomical region of the human body. In some embodiments, the body part described herein is selected from the group of neck region, posterior trunk region, anterior trunk region, upper limb region, and lower limb region. In some embodiments, the body part described herein is at least one limb region.

The term "subject", as used herein, refers to a human. In some embodiments, the subject described herein is a subject suffering from arthritis, suspected to suffer from arthritis and/or at risk to suffer from arthritis. In some embodiments, the subject described herein is a subject suffering from rheumatoid arthritis, suspected to suffer from arthritis and/or at risk to suffer from rheumatoid arthritis. The term "image", as used herein, refers to any image of a body part of a subject. An image can be in the format of, but is not limited to, a JPEG image, a PNG image, a GIF image, a TIFF image, or any other digital image format known in the art. In some embodiments, the image described herein is part of a series of images, a video, and/or a (live) stream of a device, e.g., of an imaging instrument. In some embodiments, the image comprises additional data referring to parameters of the subjects and/or parameters of a disease of a subject. In some embodiments, the image described herein is a 2D image. In some embodiments, the image described herein is a 3D image.

The term "contrast", as used herein, refers to the difference in luminance and/or color that makes a representation of an object on an image distinguishable. In some embodiments, the contrast described herein is calculated according to Weber contrast. In some embodiments, the contrast described herein is calculated according to Michelson contrast. In some embodiments, the contrast described herein is calculated according to RMS contrast. In some embodiments, the contrast described herein is the contrast of a fold line and/or an index thereof. In some embodiments, the contrast described herein is the contrast of a fold line of a joint. In some embodiments, the contrast is a change in contrast in that the contrast is determined at two points in time and the change between these timepoints is considered in the method. For example, the measurement of the contrast can be used as a biomarker of treatment success by determining the joint folds based on contrast before and after treatment and/or the change thereof. In some embodiments, a finger fold index is determined based on the contrast of a body part. In some embodiments, the finger fold index and/or further input data is used in the method of the invention.

The term "shape of the body part", as used herein, refers to the contour, the contour-derived feature and/or part of the contour of the body part. In some embodiments, the shape of the body part described herein is the edge line of the body part. In some embodiments, the contour-derived feature is a feature (e.g., shape properties such as diameter, radius, length or width) calculated from the contour of the body part. In some embodiments, the shape of the body part is the diameter of a joint and/or the contour of the knuckles. In some embodiments, the shape of the body part is the shape of the body part at two time points and/or the change in the shape of the body part over time (e.g. in the context of disease development or treatment).

In some embodiments, the classification described herein, is a classification in two or more classes (e.g., swollen/not swollen). In some embodiments, the classification described herein, is a classification on a continuous scale (e.g., degree of swelling). In some embodiments, the classification uses a classification reference value (e.g., threshold) or a classification reference pattern.

In some embodiments, the contrast of the body part and the shape of the body part on the image described herein are at least one contrast line and at least one diameter. In some embodiments, the contrast of the body part and the shape of the body part on the image described herein are at least one fold contrast line and at least one diameter of a joint.

In some embodiments, the invention relates to a method for determining a parameter indicative of the degree of swelling, atrophy and/or fibrosis of a body part of a subject, the method comprising the steps of: (I) retrieving an image of a body part of a subject, wherein the body part is capable of swelling, atrophy and/or fibrosis; (II) determining the contrast of the body part and the shape of the body part on the image; and (III) classifying the shape and contrast of step (II) to determine the parameter indicative of the degree of swelling, atrophy and/or fibrosis from the image.

In some embodiments, the invention relates to a method for determining a parameter indicative of the degree of swelling, atrophy and/or fibrosis of a body part of a subject, the method comprising the steps of: (I) retrieving an image of a body part of a subject, wherein the body part is capable of swelling, atrophy and/or fibrosis; (II) determining the contrast of the body part or the shape of the body part on the image; and (III) classifying the shape or contrast of step (II) to determine the parameter indicative of the degree of swelling, atrophy and/or fibrosis from the image.

In some embodiments, the invention relates to a method for determining a parameter indicative of the degree of swelling, atrophy and/or fibrosis of a body part of a subject, the method comprising the steps of: (I) retrieving an image of a body part of a subject, wherein the body part is capable of swelling, atrophy and/or fibrosis; (II) determining the contrast of the body part; and (III) classifying the shape (II) to determine the parameter indicative of the degree of swelling, atrophy and/or fibrosis from the image.

In some embodiments, the invention relates to a method for determining a parameter indicative of the degree of swelling, atrophy and/or fibrosis of a body part of a subject, the method comprising the steps of: (I) retrieving an image of a body part of a subject, wherein the body part is capable of swelling, atrophy and/or fibrosis; (II) determining the shape of the body part on the image; and (III) classifying the contrast of step (II) to determine the parameter indicative of the degree of swelling, atrophy and/or fibrosis from the image.

Swelling, for example induced by edemas and/or joint inflammation, alters the skin and the shape of a body part (FIG. 1). The inventors found that classifying patterns that are based on contrast and/or shape detectable on the image or the body part enables determining a parameter indicative of the degree of swelling. The determination of such a parameter can serve as a standardizable marker that is non-invasively obtainable by a person without specific training. Standardized and facilitated detection and quantification of swelling, atrophy and/or fibrosis, in particular of joint swelling and skin atrophy and/or skin fibrosis enable improvement of patient care and telemedicine.

Accordingly, the invention is at least in part based on the finding that the degree of swelling, atrophy and/or fibrosis of a body part can be determined based on image metrics e.g., of 2D images.

In certain embodiments, the invention relates to a method for determining a parameter indicative of the degree of swelling, atrophy and fibrosis of a body part of a subject, the method comprising the steps of: (I) retrieving an image of a body part of a subject, wherein the body part is capable of swelling, atrophy and fibrosis; (II) determining the contrast of shadows on the skin of the body part on the image and/or the edge line of the body part on the image; and (III) classifying the contrast of shadow on the skin of the body part on the image and/or the edge line of the body part on the image of step (II) to determine the parameter indicative of the degree of swelling, atrophy and fibrosis from the image.

In certain embodiments, the invention relates to a method for determining a parameter indicative of the degree of swelling and fibrosis of a body part of a subject, the method comprising the steps of: (I) retrieving an image of a body part of a subject, wherein the body part is capable of swelling, atrophy and fibrosis; (II) determining the contrast of shadows on the skin of the body part on the image and/or the edge line of the body part on the image; and (III) classifying the contrast of shadow on the skin of the body part on the image and/or the edge line of the body part on the image of step (II) to determine the parameter indicative of the degree of swelling and fibrosis from the image.

In certain embodiments, the invention relates to a method for determining a parameter indicative of the degree of swelling and atrophy of a body part of a subject, the method comprising the steps of: (I) retrieving an image of a body part of a subject, wherein the body part is capable of swelling and atrophy; (II) determining the contrast of shadows on the skin of the body part on the image and/or the edge line of the body part on the image; and (III) classifying the contrast of shadow on the skin of the body part on the image and/or the edge line of the body part on the image of step (II) to determine the parameter indicative of the degree of swelling and atrophy from the image.

In certain embodiments, the invention relates to a method for determining a parameter indicative of the degree of atrophy and fibrosis of a body part of a subject, the method comprising the steps of: (I) retrieving an image of a body part of a subject, wherein the body part is capable of atrophy and fibrosis; (II) determining the contrast of shadows on the skin of the body part on the image and/or the edge line of the body part on the image; and (III) classifying the contrast of shadow on the skin of the body part on the image and/or the edge line of the body part on the image of step (II) to determine the parameter indicative of the degree of atrophy and fibrosis from the image.

In certain embodiments, the invention relates to a method for determining a parameter indicative of the degree of fibrosis of a body part of a subject, the method comprising the steps of: (I) retrieving an image of a body part of a subject, wherein the body part is capable of fibrosis; (II) determining the contrast of shadows on the skin of the body part on the image and/or the edge line of the body part on the image; and (III) classifying the contrast of shadow on the skin of the body part on the image and/or the edge line of the body part on the image of step (II) to determine the parameter indicative of the degree of fibrosis from the image.

In certain embodiments, the invention relates to a method for determining a parameter indicative of the degree of atrophy of a body part of a subject, the method comprising the steps of: (I) retrieving an image of a body part of a subject, wherein the body part is capable of atrophy; (II) determining the contrast of shadows on the skin of the body part on the image and/or the edge line of the body part on the image; and (III) classifying the contrast of shadow on the skin of the body part on the image and/or the edge line of the body part on the image of step (II) to determine the parameter indicative of the degree of atrophy from the image.

In certain embodiments, the invention relates to a method for determining a parameter indicative of the degree of swelling of a body part of a subject, the method comprising the steps of: (I) retrieving an image of a body part of a subject, wherein the body part is capable of swelling; (II) determining the contrast of shadows on the skin of the body part on the image and/or the edge line of the body part on the image; and (III) classifying the contrast of shadow on the skin of the body part on the image and/or the edge line of the body part on the image of step (II) to determine the parameter indicative of the degree of swelling from the image.

In certain embodiments, the invention relates to the method according the invention, wherein the contrast of shadow on the skin of the body part on the image comprises level of contrast, width of contrast lines, length of contrast lines, angle of contrast lines and/or distance between contrast lines.

In certain embodiments, the invention relates to the method according to the invention, wherein the contrast of the body part comprises level of contrast, width of contras lines, length of contrast lines, angle of contrast lines and/or distance between contrast lines.

The inventors found that patterns of body parts (e.g. joint folds) comprise swelling-related information (FIG. 3).

Accordingly, the invention is at least in part based on the finding that the degree of swelling, atrophy and/or fibrosis of a body part can be determined based on interpreted image metrics.

In certain embodiments, the invention relates to the method according to the invention, wherein the determination of the parameter indicative of the degree of swelling, atrophy and/or fibrosis from the image is further based on a clinical parameter of the subject.

The term "clinical parameter", as used herein, refers to a parameter that is obtained from subject from which the image is taken. In certain embodiments, the clinical parameter described herein is at least one parameter selected from the group of age, gender, form of arthritis, body size, body weight and skin color. The skin color may be a skin alteration (e.g. disease induce skin alteration) and/or healthy skin color.

Clinical parameters can influence contrast and/or shape of the body part and therefore distort the parameter indicative of the degree of swelling, atrophy and/or fibrosis. For example the skin color may influence the contrast or the body weight may influence the shape of the body part.

The means and methods of the invention enable correction and/or normalization for these distortions by considering clinical parameters.

Accordingly, the invention is at least in part based on its broad applicability and high accuracy by considering clinical parameters.

In certain embodiments, the invention relates to a method for determining a score indicative of the state of arthritis from an image of a body part, wherein the method comprises the steps of: (i) determining from the image a parameter indicative of the degree of swelling, atrophy and/or fibrosis according to the invention, (ii) comparing the parameter determined in (i) to a reference parameter; and (iii) identifying a score indicative of the state of arthritis based on the comparison in step (ii).

In certain embodiments, the invention relates to a method for determining a score indicative of the state of arthritis and scleroderma from an image of a body part, wherein the method comprises the steps of: (i) determining from the image a parameter indicative of the degree of swelling, atrophy and/or fibrosis according to the invention, (ii) comparing the parameter determined in (i) to a reference parameter; and (iii) identifying a score indicative of the state of arthritis and scleroderma based on the comparison in step (ii).

In some embodiments, the scleroderma described herein is systemic scleroderma and/or a component of the CREST variant of scleroderma.

In certain embodiments, the invention relates to a method for determining a score indicative of the state of scleroderma, sclerodactyly, Raynaud's phenomenon and/or Complex Regional Pain Syndrome (CRPS) from an image of a body part, wherein the method comprises the steps of: (i) determining from the image a parameter indicative of the degree of swelling, atrophy and/or fibrosis according to the invention, (ii) comparing the parameter determined in (i) to a reference parameter; and (iii) identifying a score indicative of the state of scleroderma, sclerodactyly, Raynaud's phenomenon and/or Complex Regional Pain Syndrome (CRPS) based on the comparison in step (ii).

In certain embodiments, the invention relates to a method for determining a score indicative of the state of arthritis and Raynaud's phenomenon from an image of a body part, wherein the method comprises the steps of: (i) determining from the image a parameter indicative of the degree of swelling, atrophy and/or fibrosis according to the invention, (ii) comparing the parameter determined in (i) to a reference parameter; and (iii) identifying a score indicative of the state of arthritis and Raynaud's based on the comparison in step (ii).

In certain embodiments, the invention relates to a method for determining a score indicative of the state of scleroderma from an image of a body part, wherein the method comprises the steps of: (i) determining from the image a parameter indicative of the degree of swelling, atrophy and/or fibrosis according to the invention, (ii) comparing the parameter determined in (i) to a reference parameter; and (iii) identifying a score indicative of the state of scleroderma based on the comparison in step (ii).

In certain embodiments, the invention relates to a method for determining a score indicative of the state of Raynaud's phenomenon from an image of a body part, wherein the method comprises the steps of: (i) determining from the image a parameter indicative of the degree of swelling, atrophy and/or fibrosis according to the invention, (ii) comparing the parameter determined in (i) to a reference parameter; and (iii) identifying a score indicative of the state of Raynaud's phenomenon based on the comparison in step (ii).

In certain embodiments, the invention relates to a method for determining a score indicative of the state of arthritis, scleroderma and/or Raynaud's phenomenon from an image of a body part, wherein the method comprises the steps of: (i) determining from the image a parameter indicative of the degree of swelling, atrophy and/or fibrosis according to the invention, (ii) comparing the parameter determined in (i) to a reference parameter; and (iii) identifying a score indicative of the state of arthritis, scleroderma and/or Raynaud's based on the comparison in step (ii), wherein the score is indicative for an active state of arthritis, scleroderma and/or Raynaud's phenomenon if the parameter determined in (i) is above the reference parameter in step (ii).

In certain embodiments, the invention relates to a method for determining a score indicative of the state of arthritis from an image of a body part, wherein the method comprises the steps of: (i) determining from the image a parameter indicative of the degree of swelling, atrophy and/or fibrosis according to the invention, (ii) comparing the parameter determined in (i) to a reference parameter; and (iii) identifying a score indicative of the state of arthritis based on the comparison in step (ii), wherein the score is indicative for an active state of arthritis if the parameter determined in (i) is above the reference parameter in step (ii).

The term "arthritis", as used herein, refers to a disease or disorder or a symptom of a disease or disorder that includes joints pain and/or joint swelling. In some embodiments, the arthritis described herein is a disease or disorder, wherein joint pain is the primary feature. In some embodiments, the arthritis described herein is a disease or disorder selected from the group of osteoarthritis, rheumatoid arthritis, gout, pseudo-gout, septic arthritis, ankylosing spondylitis, juvenile idiopathic arthritis and still's disease. In some embodiments, the arthritis described herein is a disease or disorder, wherein joint pain is a secondary feature. In some embodiments, the arthritis described herein is a symptom of a disease or disorder selected from the group of psoriatic arthritis, reactive arthritis, Ehlers-Danlos syndrome, hemochromatosis, hepatitis, Lyme disease, Sjögren's disease, Hashimoto's thyroiditis, celiac disease, non-celiac gluten sensitivity, inflammatory bowel disease, Henoch-Schönlein purpura, Hyperimmunoglobulinemia D with recurrent fever, sarcoidosis, Whipple's disease, TNF receptor-associated periodic syndrome, vasculitis syndromes, familial Mediterranean fever, and systemic lupus erythematosus.

Symptoms of arthritis generally include, without limitation joint pain, joint stiffness, redness, warmth, swelling, and decreased range of motion of the affected joints.

In some embodiments, the state of arthritis described herein is indicative for at least one property selected from the group of diagnosis, prognosis, risk assessment, risk stratification and therapy control. In some embodiments, the active state of arthritis described herein is indicative for at least one property selected from the group of presence of an arthritis diagnosis, worsening of arthritis prognosis, increasing arthritis risk, and insufficient therapy control.

The term "reference parameter", as used herein, refers to a predefined parameter or a previously obtained parameter. In some embodiments, the reference parameter is a threshold value or a threshold pattern. In some embodiments, the reference parameter is a classification model, preferably a classification model trained on training data derived from reference subjects, wherein the reference subjects comprise for the indication or for each of the indications (i.e. 2 or all selected from the group consisting of arthritis, scleroderma and Raynaud's phenomenon) for which the score is indicative of at least one reference subject having the suffering indication. Therefore, the training data preferably comprises positive controls. In some embodiments, the training data additionally comprises healthy reference subjects as negative controls.

The inventors found that detection of swelling, atrophy and/or fibrosis, in particular swelling in an image of a body part can be used as an automatable marker for arthritis.

Standardized and facilitated detection and quantification of swelling, atrophy and/or fibrosis, in particular of joint swelling, joint atropy and skin fibrosis enable improvement of patient care and telemedicine, in particular as a tool to assess disease activity in arthritis in patients with arthritis.

Accordingly, the invention is at least in part based on the finding that the state of arthritis can be determined based on image metrics of a body part.

In certain embodiments, the invention relates to a therapy for use in the treatment of arthritis in a subject, and wherein the therapy is applied to the subject having a score indicative for an active state of arthritis determined according to the invention.

The term "therapy for use in the treatment of arthritis", as used herein, refers to any therapy that can be used to alter the natural course arthritis of the individual being treated, and can be performed either for prophylaxis or during the course of clinical pathology. In some embodiments, the therapy for use in the treatment of arthritis described herein is an intervention selected from the group of surgical interventions, transcutaneous electrical nerve stimulation, low-level laser therapy, pulsed electromagnetic field therapy, and pharmaceutical compositions for use in the treatment of arthritis.

In certain embodiments, the invention relates to a pharmaceutical composition for use in the treatment of arthritis in a subject, wherein the subject has a score indicative for an active state of arthritis determined according to the method of the invention.

The term "pharmaceutical composition for use in the treatment of arthritis", as used herein, refers to any pharmaceutical composition that can be used to alter the natural course arthritis of the individual being treated, and can be performed either for prophylaxis or during the course of clinical pathology. Desirable effects of treatment include, but are not limited to, preventing occurrence or recurrence of disease, alleviation of symptoms, diminishment of any direct or indirect pathological consequences of the disease, decreasing the rate of disease progression, amelioration or palliation of the disease state, and remission or improved prognosis. In some embodiments, the pharmaceutical composition for use in the treatment of arthritis is a pharmaceutical composition that is FDA approved for arthritis. In some embodiments, the pharmaceutical composition for use in the treatment of arthritis is a pharmaceutical composition that is FDA approved for at least one indication selected from the group consisting of osteoarthritis, rheumatoid arthritis, gout, pseudo-gout, septic arthritis, psoriasis arthritis, spondyloarthritis, juvenile idiopathic arthritis, crystal-associated arthritis and still's disease. In some embodiments, the pharmaceutical composition for use in the treatment of arthritis described herein comprises at least one compound selected from the group of acetaminophen, non-steroidal anti-inflammatory drugs, corticosteroids, opioids, monoclonal antibodies and disease-modifying antirheumatic drugs. In some embodiments, the pharmaceutical composition for use in the treatment of arthritis described herein comprises at least one compound selected from the group of csDMARDs, tsDMARDs and bDMARDs. In some embodiments, the pharmaceutical composition for use in the treatment of arthritis described herein comprises at least one compound selected from the group of abatacept, adalimumab, anakinra, apremilast, azathioprine, baricitinib, certolizumab pegol, chloroquine, ciclosporin, D-penicillamine, etanercept, filgotinib, golimumab, gold salts, guselkumab, hydroxychloroquine, infliximab, leflunomide, methotrexate, minocycline, mycophenolat, rituximab, sarilumab, secukinumab, sulfasalazine, tocilizumab, tofacitinib, ustekinumab, upadazinib, cyclophosphamide, steroid, salicylate-NSAID, propionic acid derivative-NSAID, acetic acid derivative-NSAID, enolic acid derivative-NSAID, anthranilic acid derivative-NSAID, COX-2 selective inhibitor-NSAID, sulfonanilide-NSAID.

In certain embodiments, the pharmaceutical composition for use in the treatment of arthritis described herein is administered systemically or topically. In certain embodiments, the pharmaceutical composition for use in the treatment of arthritis described herein is administered by a route selected from the group of oral, sublingual, buccal, nasal, intrapulmonary, transdermal, bronchial, intramuscular, intravenous, intraarterial, intraperitoneal, subcutaneous, rectal, urethral, and intravaginal administration.

The subjectivity of self-reports included previous disease state assessment methods may lead to a biased assessment. This biased assessment may result in a reduced effect of a pharmaceutical composition for use in the treatment of arthritis. The requirement for trained clinicians and/or laboratory analysis of previous disease state assessment methods may delay the assessment of the disease state. This delay can reduce the effect of a pharmaceutical composition for use in the treatment of arthritis due to late therapy start. Furthermore, symptoms of arthritis can fluctuate (e.g., worsening in the morning, improvement in the evening). Repeated measurement timepoints enabled by facilitation of the assessment of arthritis improve the effect of a pharmaceutical composition for use in the treatment of arthritis by personalizing the treatment, e.g., by personalizing the dose regime of the pharmaceutical composition for use in the treatment of arthritis.

The inventors found that the state of arthritis determined according to the invention is suitable to determine the subjects and timepoints, wherein the pharmaceutical composition is effective or particularly effective, in a fast and standardized manner.

Accordingly, the invention is at least in part based on the finding that the effect of a pharmaceutical composition for use in the treatment of arthritis can be improved in a subject by assessment of the state of arthritis according to the method of the invention.

In certain embodiments, the invention relates to the method of the invention, wherein the reference parameter is said parameter obtained from prior analysis of said subject.

In certain embodiments, the invention relates to the pharmaceutical composition for use of the invention, wherein the reference parameter is said parameter is obtained from prior analysis of said subject.

The "prior analysis" described herein can be any assessment of the state of arthritis. In some embodiments, the prior analysis described herein is the determination of a score indicative of the state of arthritis according to the invention. In some embodiments, the prior analysis described herein is the assessment of the state of arthritis by an alternative method (e.g., by diagnosis by a doctor). The assessment of the state of arthritis by an alternative method and repetition of the assessment by the method of the invention combines potential advantages of both methods (e.g., comprehensive disease markers of the alternative method and flexibility of the method of the invention)

The symptom intensity of arthritis can fluctuate over time (e.g., worsening in the morning, improvement in the evening). The method of the invention facilitates disease state assessment compared to established methods and therefore enables repeated assessment of arthritis in the same subject and can therefore reveal symptom progression patterns and enables standardized monitoring of symptom fluctuation.

The method of the invention is also suitable for repeated assessment of the disease-state with larger measurement intervals such as daily, weekly, monthly, every 2, 3, 4, 5, 6, 7, 8, 9, 10, 11 months or annually. This repeated assessment of the state of the disease, wherein at least one assessment comprises determining a score indicative of the state of arthritis according to the method of the invention, enables monitoring of the development of arthritis, progression of arthritis, and/or treatment success of pharmaceutical composition of the invention.

Accordingly, the invention is at least in part based on the finding that the development and/or progression of arthritis can be assessed based on image metrics of a body part.

In certain embodiments, the invention relates to the method of the invention, wherein the reference parameter is said parameter obtained from at least one reference subject, wherein the at least one reference subject is a subject not suffering from arthritis and/or from swelling, atrophy and/or fibrosis of the body part, and/or is a subject suffering from arthritis and/or from swelling, atrophy and/or fibrosis of the body part.

In certain embodiments, the invention relates to the method of the invention, wherein the reference parameter is a parameter obtained from at least one two reference subjects, wherein the at least one reference subject is a subject not suffering from arthritis and/or from swelling, atrophy and/or fibrosis of the body part, and/or at least one reference is a subject is suffering from arthritis and/or from swelling, atrophy and/or fibrosis of the body part.

In certain embodiments, the invention relates to the pharmaceutical composition for use of the invention, wherein the reference parameter is said parameter is obtained from at least one reference subject, wherein the at least one reference subject is a subject not suffering from arthritis and/or from swelling, atrophy and/or fibrosis of the body part, and/or is a subject suffering from arthritis and/or from swelling, atrophy and/or fibrosis of the body part.

In certain embodiments, the invention relates to the pharmaceutical composition for use of the invention, wherein the reference parameter is a parameter obtained from at least one two reference subjects, wherein the at least one reference subject is a subject not suffering from arthritis and/or from swelling, atrophy and/or fibrosis of the body part, and/or at least one reference is a subject is suffering from arthritis and/or from swelling, atrophy and/or fibrosis of the body part.

In certain embodiments, the invention relates to a method for determining a score indicative of the likelihood of a subject of having arthritis, scleroderma or Raynaud's phenomenon from an image of a body part, wherein the method comprises the steps of: (i) determining from an image of a body part of a subject a parameter indicative of the degree of swelling, atrophy and fibrosis according to the method of the invention; (ii) comparing the parameter determined in (i) to a distinguishing reference pattern, wherein the distinguishing reference pattern is obtained from at least three reference subjects, wherein at least one reference subject has arthritis, at least one reference subject has scleroderma and at least one reference subject has Raynaud's phenomenon; and (iii) identifying a score indicative of the likelihood of the subject of having arthritis, scleroderma or Raynaud's phenomenon based on the comparison in step (ii).

In certain embodiments, the invention relates to a method for determining a score indicative of the likelihood of a subject of having arthritis or Raynaud's phenomenon from an image of a body part, wherein the method comprises the steps of: (i) determining from an image of a body part of a subject a parameter indicative of the degree of swelling, atrophy and fibrosis according to the method of the invention; (ii) comparing the parameter determined in (i) to a distinguishing reference pattern, wherein the distinguishing reference pattern is obtained from at least two reference subjects, wherein at least one reference subject has arthritis and at least one reference subject has Raynaud's phenomenon; and (iii) identifying a score indicative of the likelihood of the subject of having arthritis or Raynaud's phenomenon based on the comparison in step (ii).

In certain embodiments, the invention relates to a method for determining a score indicative of the likelihood of a subject of having scleroderma or Raynaud's phenomenon from an image of a body part, wherein the method comprises the steps of: (i) determining from an image of a body part of a subject a parameter indicative of the degree of swelling, atrophy and fibrosis according to the method of the invention; (ii) comparing the parameter determined in (i) to a distinguishing reference pattern, wherein the distinguishing reference pattern is obtained from at least two reference subjects, wherein at least one reference subject has scleroderma and at least one reference subject has Raynaud's phenomenon; and (iii) identifying a score indicative of the likelihood of the subject of having scleroderma or Raynaud's phenomenon based on the comparison in step (ii).

In certain embodiments, the invention relates to a method for determining a score indicative of the likelihood of a subject of having arthritis or scleroderma from an image of a body part, wherein the method comprises the steps of: (i) determining from an image of a body part of a subject a parameter indicative of the degree of swelling, atrophy and fibrosis according to the method of the invention; (ii) comparing the parameter determined in (i) to a distinguishing reference pattern, wherein the distinguishing reference pattern is obtained from at least two reference subjects, wherein at least one reference subject has arthritis and at least one reference subject has scleroderma and (iii) identifying a score indicative of the likelihood of the subject of having arthritis or scleroderma based on the comparison in step (ii).

The comparison based on the distinguishing reference pattern may be done by determining the similarity of the subject for which the score is determined to the respective reference subject(s). In some embodiments, the distinguishing reference pattern comprises a threshold or a plurality of thresholds. In some embodiments, the distinguishing reference pattern is a model with equivalent properties described herein for the "reference parameter".

The method described herein for determining a score indicative of the likelihood of a subject of having a certain indication can enable differential diagnosis, support diagnosis and/or treatment decisions.

In some embodiments, at least one reference subject matches the subject in at least one property selected from the group of age, gender, form of arthritis, grade of arthritis, form of scleroderma, grade of scleroderma, grade of Raynaud's phenomenon, type of Raynaud's phenomenonbody size, body weight, and skin color.

In some embodiments, the score indicative of the likelihood of the subject of having one or more of certain diseases (i.e. arthritis, scleroderma and/or Raynaud's phenomenon) is a category determined based on a classification.

In some embodiments, at least one reference subject matches the subject in at least one property selected from the group of age, gender, form of arthritis, body size, body weight, and skin color. In some embodiments, at least one reference subject was part of a standardized clinical trial.

The use of a reference parameter obtained from at least one reference subject enables the method to be particularly accurate (Example 1, 2).

Accordingly, the invention is at least in part based on the finding that the state of arthritis can be determined particularly accurately based on image metrics that are compared to a reference parameter comprising image metrics of at least one reference subject.

In certain embodiments, the invention relates to the method of the invention, wherein a decrease of the parameter compared to the reference parameter indicates that arthritis deteriorates, wherein an increase of the parameter compared to the reference parameter indicates that arthritis ameliorates, or wherein an identical parameter compared to the reference parameter indicates that arthritis halts.

In certain embodiments, the invention relates to the pharmaceutical composition for use of the invention, wherein a decrease of the parameter compared to the reference parameter indicates that arthritis deteriorates, wherein an increase of the parameter compared to the reference parameter indicates that arthritis ameliorates, or wherein an identical parameter compared to the reference parameter indicates that arthritis halts.

The phrase "decrease of the parameter compared to the reference parameter", as used herein, refers to a deviation of the parameter compared to the reference parameter, wherein the deviation is in the opposite direction of the "increase of the parameter compared to the reference parameter". Therefore, the terms "increase" and "decrease" refer to opposite deviations but "increase" does not necessarily mean "higher value" and "decrease" does not necessarily mean "lower value".

In some embodiments, the arthritis deterioration described herein indicates at least one characteristic selected from the group of worsening of an arthritis diagnosis, worsening of arthritis prognosis, increasing arthritis risk, and insufficient therapy control.

In some embodiments, the arthritis amelioration described herein indicates at least one characteristic selected from the group of improvement of an arthritis diagnosis, improvement of arthritis prognosis, reduction of arthritis risk, and sufficient therapy control.

In some embodiments, the arthritis halts described herein indicates at least one characteristic selected from the group of remaining of an arthritis diagnosis, remaining of arthritis prognosis, remaining of arthritis risk, and remaining therapy control.

Accordingly, the invention is at least in part based on the finding that the development and/or progression of arthritis can be assessed based on image metrics of a body part.

In certain embodiments, the invention relates to the method of the invention, wherein the reference parameter is a library of reference parameters.

In certain embodiments, the invention relates to the pharmaceutical composition for use of the invention, wherein the reference parameter is a library of reference parameters.

The term "library", as described herein, refers to a structured collection of at least one parameter from more than one reference subject. The library described herein is preferably computer readable, such as in the form of code. In some embodiments, the library is a set of weights, preferably a set of weights that can be used for classification.

The use of a library of reference parameters enables the method to be particularly accurate (Example 1, 2, FIG. 9).

Accordingly, the invention is at least in part based on the finding that the state of arthritis can be determined particularly accurately based on image metrics that are compared to a library of reference parameters.

In certain embodiments, the invention relates to the method the invention, wherein the reference parameter is a library of reference parameters, wherein the library is generated by machine learning.

In certain embodiments, the invention relates to the pharmaceutical composition for use of the invention, wherein the reference parameter is a library of reference parameters, wherein the library is generated by machine learning.

In certain embodiments, automated image extraction of body regions capable of swelling, atrophy and/or fibrosis can be applied.

In certain embodiments, automated image extraction of contrast-giving structures can be applied.

The term "machine-learning technique", as used herein, refers to a computer-implemented technique that enables automatic learning and/or improvement from an experience (e.g., training data and/or obtained data) without the necessity of explicit programming of the lesson learned and/or improved. In some embodiments, the machine learning technique comprises at least one technique selected from the group of Logistic regression, CART, Bagging, Random Forest, Gradient Boosting, Linear Discriminant Analysis, Gaussian Process Classifier, Gaussian NB, Linear, Lasso, Ridge, ElasticNet, partial least squares, KNN, DecisionTree, SVR, AdaBoost, GradientBoost, neural net, and ExtraTrees.

In some embodiments, described features can be extracted and used as image preprocessing to improve the accuracy of algorithms. Such preprocessed features, and or the obtained parametres, can serve alone or in combination with other features as input features for machine learning. Such features can be extracted by filters or algorithms and used as image preprocessing e.g. by canny edge detection, ridge detection or Fourier transforms to improve the accuracy of algorithms.

In some embodiments, a supervised machine learning technique is used to generate the library described herein. In some embodiments, the supervised machine learning technique described herein is trained and/or validated using data labeled by at least one person qualified to diagnose arthritis.

The use of a library generated by machine learning enables the method to be particularly accurate (Example 2, FIG. 9) and to correct for confounding factors.

Accordingly, the invention is at least in part based on the finding that the state of arthritis can be determined particularly accurately based on image metrics that are compared to a machine-learning-based library.

In certain embodiments, the invention relates to the method the invention, wherein the reference parameter is a library of reference parameters, wherein the library is generated by a technique selected from the group of deep learning, convolutional networks, decision trees, and fuzzy nets.

In certain embodiments, the invention relates to the pharmaceutical composition for use of the invention, wherein the reference parameter is a library of reference parameters, wherein the library is generated by a technique selected from the group of deep learning, convolutional networks, decision trees, and fuzzy nets.

The term "deep learning", as used herein, refers to a machine learning technique based on artificial neural networks in which multiple layers of processing are used to extract higher-level features from data.

The term "convolutional network", as used herein, refers to a network that employs convolution in place of general matrix multiplication in at least one of the layers.

The term "decision tree", as used herein, refers to a technique that uses a tree-like model of decisions and their possible consequences, including but not limited to chance event outcomes, resource costs, and utility.

The term "fuzzy net", as used herein, refers to a network to process fuzzy reasoning.

The use of certain machine learning techniques enables the method to be particularly accurate (Example 2, FIG. 9) and can reduce the number of images needed fro training.

Accordingly, the invention is at least in part based on the finding that the state of arthritis can be determined particularly accurately by using certain machine learning techniques to generate the library.

In certain embodiments, the invention relates to the method of the invention, or the pharmaceutical composition for use of the invention, wherein the comparison step comprises automated feature learning.

In certain embodiments, the invention relates to the method of the invention, or the pharmaceutical composition for use of the invention, wherein the comparison step comprises automated feature learning.

In certain embodiments, the invention relates to the method of the invention, wherein the comparison step comprises automated feature learning and classification steps.

In certain embodiments, the invention relates to the pharmaceutical composition for use of the invention, wherein the comparison step comprises automated feature learning and classification steps.

The term "automated feature learning", as used herein, refers to at least one technique that allows a system to automatically discover the representations needed for feature detection or classification from raw data. In some embodiments, the automated feature learning described herein refers to unsupervised feature learning. In some embodiments, the automated feature learning described herein refers to supervised feature learning.

The image of the body part may be preprocessed using automated feature learning and/or classification steps to extract relevant features (e.g., body part areas such as joints and tendons from the image).

This preprocessing removes less relevant information of the image from further processing steps and thus improves accuracy, standardization, and computational resource use. Therefore, the use of automated feature learning and/or classification steps enable(s) the method to be particularly standardized and resource-efficient (Example 2, FIG. 2, 5, 9).

Accordingly, the invention is at least in part based on the finding that the state of arthritis can be determined particularly accurately by certain processing steps.

In certain embodiments, the invention relates to the method of the invention, wherein the state of arthritis comprises an inflammation grade and/or synovitis grade.

In certain embodiments, the invention relates to the pharmaceutical composition for use of the invention, wherein the state of arthritis comprises an inflammation grade and/or synovitis grade.

The inventors found that the patterns detectable on the image of the body part can be processed to not only be indicative for swelling, but also underlying inflammation grade, as the cause of swelling. More specifically, the image of the body part can be processed to be indicative for synovitis, as the hallmark of arthritis. The more inflamed the body part (e.g. the joint) is, the less deep are the folds and the less contrasted are those (FIG. 4).

Accordingly, the invention is at least in part based on the finding that the method of the invention enables distinguishing inflammation and synovitis grades.

In certain embodiments, the invention relates to the method of the invention, or the pharmaceutical composition for use of the invention, wherein the body part is a foot of a subject.

In certain embodiments, the invention relates to the method of the invention, wherein the body part is a hand and/or a foot of a subject.

In certain embodiments, the invention relates to the pharmaceutical composition for use of the invention, wherein the body part is a hand and/or a foot of a subject.

The inventors found that hands and feet comprise particular informative patterns regarding swelling, atrophy, fibrosis and/or arthritis. The joints of fingers and toes are particularly affected by arthritis (Examples 1, 2, FIGS. 3, 6, 7, 8A-C, 9).

Accordingly, the invention is at least in part based on the finding that images of a hand and/or a foot enable the method of the invention to be particularly accurate.

In certain embodiments, the invention relates to the method of the invention, wherein the body part is a hand of the subject.

In certain embodiments, the invention relates to the pharmaceutical composition for use of the invention, wherein the body part is a hand of the subject.

The inventors found that images of hands comprise particular informative patterns regarding swelling, atrophy, fibrosis and/or arthritis. The joints of fingers are particularly affected by arthritis (Examples 1, 2, FIGS. 3, 6, 7, 8A-C, 9).

Accordingly, the invention is at least in part based on the finding that images of a hand enable the method of the invention to be particularly accurate.

In certain embodiments, the invention relates to the method of the invention, wherein the body part comprises a proximal interphalangeal joint, an extensor tendon, a metacarpophalangeal joint, and/or a distal interphalangeal joint.

In certain embodiments, the invention relates to the method of the invention, wherein the body part comprises the dorsal side of an interphalangeal joint.

In certain embodiments, the invention relates to the pharmaceutical composition for use of the invention, wherein the body part comprises a proximal interphalangeal joint, an extensor tendon, a metacarpophalangeal joint, and/or a distal interphalangeal joint.

The inventors found that images of elements of hands comprise particular informative patterns regarding swelling, atrophy, fibrosis and/or arthritis. The joints of fingers are particularly affected by arthritis (Examples 1, 2, FIGS. 3, 6, 7, 8A-C, 9).

Accordingly, the invention is at least in part based on the finding that patterns in certain parts of the hand enable the method of the invention to be particularly accurate.

In certain embodiments, the invention relates to the method of the invention, wherein the body part comprises dorsal finger skin folds of the proximal interphalangeal joint, a skin fold of the extensor tendon, and/or the metacarpophalangeal joints.

In certain embodiments, the invention relates to the pharmaceutical composition for use of the invention, wherein the body part comprises dorsal finger skin folds of the proximal interphalangeal joint, a skin fold of the extensor tendon, and/or the metacarpophalangeal joints.

The inventors identified patterns of skin folds, in particular of dorsal finger skin folds of the proximal interphalangeal joint, skin folds of the extensor tendon, and/or the metacarpophalangeal joints as an indicator of atrophy, fibrosis swelling and synovitis.

The depth of skin folds is reduced in swollen hand joints and thus the contrast and number of finger folds are lower in inflamed versus non-inflamed hand joints. The contrast of skin folds, the number of skin folds, the length of skin folds, the angle of the skin fold, the branching of the skin folds and the distance between the skin folds change according to the degree of inflammation in systemic diseases such as rheumatoid arthritis or other forms of arthritis.

The contour of extensor tendons of the metacarpophalangeal finger joints reduces in contrast when they are inflamed (FIG. 7).

Therefore, the inventors found that dorsal finger skin folds of the proximal interphalangeal joint, a skin fold of the extensor tendon, and/or the metacarpophalangeal joints comprise particular informative patterns regarding swelling, atrophy, fibrosis and/or arthritis. The joints of fingers are particularly affected by arthritis (Examples 1, 2, FIG. 3, 6, 7, 8A-C, 9).

Accordingly, the invention is at least in part based on the finding that patterns in skin folds enable the method of the invention to be particularly accurate.

In certain embodiments, the invention relates to the method of the invention, wherein the parameter is the shape of the skin folds, the contrast of the skin folds, the number of the skin folds, the length or thickness of the skin folds, the distance between skin folds, the branching skin folds and/or the contour of the body part.

In certain embodiments, the invention relates to the pharmaceutical composition for use of the invention, wherein the parameter is the shape of the skin folds, the contrast of the skin folds, the number of the skin folds, the length or thickness of the skin folds, the distance between skin folds, the branching skin folds and/or the contour of the body part.

The inventors found that skin folds can be analyzed according to their shape, contrast, number, thickness and/or length (Example 1, FIG. 3). Further, inflammation swelling, atrophy and/or fibrosis can be assessed by the contour of the fist (FIG. 6).

Accordingly, the invention is at least in part based on the finding that shape and/or contrast in skin folds and/or contour enable(s) the method of the invention to be particularly accurate.

In certain embodiments, the invention relates to the method of the invention, or the pharmaceutical composition for use of the invention, wherein the parameter is/are at least one, two, three, or four parameter(s) selected from the group of (a) the shape of the dorsal finger skin folds of the proximal interphalangeal joint, (b) the contrast of the dorsal finger skin folds of the proximal interphalangeal joint, and (c) the contrast of the extensor tendon, and/or (d) the contour of the metacarpophalangeal relief.

In certain embodiments, the invention relates to the method of the invention, or the pharmaceutical composition for use of the invention, wherein the parameter is (a) the shape of the dorsal finger skin folds of the proximal interphalangeal joint, and (b) the contrast of the dorsal finger skin folds of the proximal interphalangeal joint.

In certain embodiments, the invention relates to the method of the invention, or the pharmaceutical composition for use of the invention, wherein the parameter is (a) the contrast of the dorsal finger skin folds of the proximal interphalangeal joint, and (b) the contrast of the extensor tendon.

In certain embodiments, the invention relates to the method of the invention, or the pharmaceutical composition for use of the invention, wherein the parameter is (a) the contrast of the dorsal finger skin folds of the proximal interphalangeal joint, and (b) the contour of the metacarpophalangeal relief.

In certain embodiments, the invention relates to the method of the invention, or the pharmaceutical composition for use of the invention, wherein the parameter is (a) the contrast of the dorsal finger skin folds of the proximal interphalangeal joint, (b) the contrast of the extensor tendon, (c) the contour of the metacarpophalangeal relief.

In certain embodiments, the invention relates to the method of the invention, or the pharmaceutical composition for use of the invention, wherein the parameter is (a) the shape of the dorsal finger skin folds of the proximal interphalangeal joint, (b) the contrast of the dorsal finger skin folds of the proximal interphalangeal joint, and (c) the contrast of the extensor tendon.

In certain embodiments, the invention relates to the method of the invention, or the pharmaceutical composition for use of the invention, wherein the parameter is (a) the shape of the dorsal finger skin folds of the proximal interphalangeal joint, (b) the contrast of the dorsal finger skin folds of the proximal interphalangeal joint, and (c) the contour of the metacarpophalangeal relief.

In certain embodiments, the invention relates to the method of the invention, wherein the parameter is (a) the shape of the dorsal finger skin folds of the proximal interphalangeal joint, (b) the contrast of the dorsal finger skin folds of the proximal interphalangeal joint, (c) the contrast of the extensor tendon, and/or (d) the contour of the metacarpophalangeal relief.

In certain embodiments, the invention relates to the pharmaceutical composition for use of the invention, wherein the parameter is (a) the shape of the dorsal finger skin folds of the proximal interphalangeal joint, (b) the contrast of the dorsal finger skin folds of the proximal interphalangeal joint, (c) the contrast of the extensor tendon, and/or (d) the contour of the metacarpophalangeal relief.

In certain embodiments, the invention relates to the method of the invention, wherein the parameter is (a) the shape edge line of the dorsal finger skin folds of the proximal interphalangeal joint, (b) the contrast of shadow of the dorsal finger skin folds of the proximal interphalangeal joint, (c) the contrast of the shadow of extensor tendon, and/or (d) the contour of the metacarpophalangeal relief.

In certain embodiments, the invention relates to the pharmaceutical composition for use of the invention, wherein the parameter is (a) the shape edge line of the dorsal finger skin folds of the proximal interphalangeal joint, (b) the contrast of shadow of the dorsal finger skin folds of the proximal interphalangeal joint, (c) the contrast of the shadow of extensor tendon, and/or (d) the contour of the metacarpophalangeal relief.

In certain embodiments, the invention relates to the method of the invention, wherein the edge line shape of the dorsal finger skin folds of the proximal interphalangeal joint, the contrast of the shadow of dorsal finger skin folds of the proximal interphalangeal joint, the contrast of shadow of the extensor tendon, and/or the contour of the metacarpophalangeal relief is/are determined.

In certain embodiments, the invention relates to the pharmaceutical composition for use of the invention, wherein the edge line shape of the dorsal finger skin folds of the proximal interphalangeal joint, the contrast of the shadow of dorsal finger skin folds of the proximal interphalangeal joint, the contrast of shadow of the extensor tendon, and/or the contour of the metacarpophalangeal relief is/are determined.

During synovitis, the aspects of dorsal finger folds change, due to underlying synovitis and soft-tissue edema, respectively. The changing aspect of dorsal finger folds in arthritis affects most notably the contrast of deep dorsal finger folds. This also applies for dactylitis, where the complete finger or toe is inflamed. Reduced depth of the finger folds leads to a lesser black contrast and a reduced transverse length. The distances between finger folds increase. Thus, dorsal finger fold contrast and pattern correlates with joint swelling.

This process of altering patterns is not restricted to transverse finger folds but applies similarly to the relief of metacarpophalangeal joints. In these joints, the patterns can be obtained from tendons or vessels of the flat hand (FIG. 7).

To monitor metacarpophalangeal swelling, the knuckles of a subject can be assessed e.g. in an image of a hand formed to a fist. The relief of the knuckles is reduced if metacarpophalangeal synovitis is present (FIG. 6).

Certain hand characteristics and certain combinations of hand characteristics (e.g. the combined use of input data from finger folds or knuckle relief) increase the accuracy of the method and/or lowers the required size of the training dataset to adequately train the machine learning technique.

Accordingly, the invention is at least in part based on the finding that shape and/or contrast in certain skin folds, certain tendons and/or certain contours enable the method of the invention to be particularly accurate.

In certain embodiments, the invention relates to the method of the invention, wherein the parameter indicates whether arthritis ameliorates, halts, or deteriorates.

In certain embodiments, the invention relates to the pharmaceutical composition for use of the invention, wherein the parameter indicates whether arthritis ameliorates, halts, or deteriorates.

Accordingly, the invention is at least in part based on the finding that the development and/or progression of arthritis can be assessed by using the method of the invention.

In certain embodiments, the invention relates to the method of the invention, wherein the shape of the dorsal finger skin folds of the proximal interphalangeal joint, the contrast of the dorsal finger skin folds of the proximal interphalangeal joint, the contrast of the extensor tendon, and/or the contour of the metacarpophalangeal relief is/are determined.

In certain embodiments, the invention relates to the pharmaceutical composition for use of the invention, wherein the shape of the dorsal finger skin folds of the proximal interphalangeal joint, the contrast of the dorsal finger skin folds of the proximal interphalangeal joint, the contrast of the extensor tendon, and/or the contour of the metacarpophalangeal relief is/are determined.

Therefore, the characteristics (e.g. hand characteristics) determined by the method can be the parameter or can be determined and further processed to the parameter (Example 1).

In certain embodiments, the invention relates to the method of the invention, wherein the method is combined with automated evaluation of skin and/or nail disease.

In certain embodiments, the invention relates to the method of the invention, wherein the arthritis is selected from the group consisting of osteoarthritis, rheumatoid arthritis, gout, pseudo-gout, septic arthritis, psoriasis arthritis, spondyloarthritis, juvenile idiopathic arthritis, crystal-associated arthritis and still's disease.

In certain embodiments, the invention relates to the pharmaceutical composition for use of the invention, wherein the arthritis is selected from the group consisting of osteoarthritis, rheumatoid arthritis, gout, pseudo-gout, septic arthritis, psoriasis arthritis, spondyloarthritis, juvenile idiopathic arthritis, crystal-associated arthritis, and still's disease.

The term "osteoarthritis", as used herein, refers to a degenerative joint disease that results from the breakdown of joint cartilage and underlying bone. Symptoms of osteoarthritis include, without limitation joint pain, stiffness, joint swelling, and decreased range of motion.

The term "rheumatoid arthritis", as used herein, refers to an autoimmune disorder that primarily affects joints. Symptoms of rheumatoid arthritis include, without limitation, warm, swollen, painful joints, low red blood cells, inflammation around the lungs, inflammation around the heart, and rheumatoid nodules.

The term "crystal-associated arthritis", as used herein, refers to a disease or disorder characterized by the accumulation of tiny crystals in one or more joints. In some embodiments, the crystal-associated arthritis described herein is gout or pseudo-gout. In some embodiments, crystal-associated arthritis comprises calcium pyrophosphate dihydrate crystal formation, hydroxyapatite deposition, and/or calcium oxalate deposition.

The term "gout", as used herein, refers to a disorder of purine metabolism characterized by recurrent attacks of pain and red, tender, hot, and/or swollen joints. Pain during the recurring attacks typically comes on rapidly, reaching maximal intensity in less than 12 hours. Symptoms of gout include, without limitation joint pain, joint swelling, joint redness tophi, kidney stones, or kidney damage.

The term "pseudo-gout", as used herein, refers to a calcium pyrophosphate dihydrate crystal deposition disease. Symptoms of pseudo-gout include, without limitation, pain, warmth of one or more joint, and/or swelling of one or more joints.

The term "septic arthritis", as used herein, refers to joint inflammation caused by an infectious agent. In some embodiments, the infectious agent is selected from the group of bacteria, viruses, fungi, and parasites. In some embodiments, the septic arthritis is septic arthritis of an artificial joint implant. Symptoms of septic arthritis include, without limitation red, hot, and/or painful joint.

The term "psoriasis arthritis", as used herein, refers to a form of arthritis that occurs in patients with psoriasis. Most people develop psoriasis first and are later diagnosed with psoriatic arthritis, but the joint problems can sometimes begin before skin patches appear. Symptoms of psoriasis arthritis include, without limitation pain in one or more joints, swelling in one or more joints, stiffness in one or more joints, swelling of fingers and toes, changes to the nails such as small depressions in the nail (pitting), thickening of the nails and detachment of the nail from the nailbed.

In certain embodiments, the invention relates to the method of the invention, wherein the arthritis is psoriasis arthritis and the method is combined with automated evaluation of skin and/or nail disease.

The term "spondyloarthritis", as used herein, refers to a rheumatoid factor negative joint disease of the vertebral column. In some embodiments the spondyloarthritis described herein is at least one indication selected from the group of axial spondyloarthritis, reactive arthritis, enteropathic arthropathy, psoriatic arthritis, isolated acute anterior uveitis, juvenile idiopathic arthritis, undifferentiated spondyloarthropathy, Behcet's disease, and Whipple's disease. Symptoms of spondyloarthritis include, without limitation inflammatory axial arthritis, sacroiliitis, spondylitis, oligoarthritis, enthesitis (e.g., plantar fasciitis, achilles tendinitis, costochondritis), and inflammatory symptoms on eyes (anterior uveitis), skin, genitourinary tract and aortic regurgitation.

The term "juvenile idiopathic arthritis", as used herein, refers to arthritis with a disease onset before 16 years of age. Symptoms of juvenile idiopathic arthritis include, without limitation fever, rash, enlarged lymph nodes, enlarged liver, enlarged spleen, serositis, anemia, limb-length discrepancy, joint contractures, muscle weakness, muscle wasting, lethargy, fatigue, poor appetite, joint contractures, joint swelling and joint pain.

The term "still's disease", as used herein, refers to rheumatoid arthritis with extra-articular manifestations like fever and rash. In some embodiments, the still's disease described herein refers to systemic-onset juvenile idiopathic arthritis. In some embodiments, the still's disease described herein refers to adult-onset Still's disease. Symptoms of still's disease include, without limitation fevers, rash, enlargement of the liver and spleen, enlargement of the lymph nodes, anemia, inflammation of the pleura, inflammation of the pericardium, inflammation of the heart's muscular tissue and inflammation of the peritoneum.

In some embodiments, the method of the invention is able to detect swelling and synovitis. In some embodiments, the method of the invention is able to detect swelling and tenosynovitis. In some embodiments, the method of the invention is able to detect swelling and dactylitis.

In some embodiments, the method of the invention can distinguish between two or more forms of arthritis such as forms of arthritis described herein. Swelling of certain joints and/or swelling of (certain) bones is/are specific for certain forms of arthritis, these specific characteristics can be used to distinguish arthritis forms using the method of the invention.

Accordingly, the invention is at least in part based on the finding that the method of the invention is particularly useful for indications, wherein joint pain is the main feature.

In certain embodiments, the invention relates to the method of the invention, wherein the arthritis is rheumatoid arthritis.

In certain embodiments, the invention relates to the pharmaceutical composition for use of the invention, wherein the arthritis is rheumatoid arthritis.

The proximal interphalangeal and metacarpal joints are particularly affected by rheumatoid arthritis and these joints can be analysed particularly well with the means and methods of the invention.

Accordingly, the invention is at least in part based on the finding that the method of the invention is particularly useful in the contexts of rheumatoid arthritis.

In certain embodiments, the invention relates to the method of the invention, wherein the body part is the distal interphalangeal joint, and wherein the arthritis is osteoarthritis.

In certain embodiments, the invention relates to the pharmaceutical composition for use of the invention, wherein the body part is the distal interphalangeal joint, and wherein the arthritis is osteoarthritis.

The method of the invention can be applied to the distal interphalangeal joint of the hand of a subject having osteoarthritis. In this context, the method of the invention assesses primarily bone hypertrophy rather than synovitis.

Accordingly, the invention is at least in part based on the finding that the method of the invention using patterns of the distal interphalangeal joint is particularly useful in the contexts of osteoarthritis.

In certain embodiments, the invention relates to the method of the invention, wherein the method further comprises obtaining the image of the body part.

Images are typically obtained by capturing the body part with a visible, infrared, or other capture device, typically a camera. In some embodiments, the image represents a distribution of electromagnetic radiation at an image plane formed by an imaging lens. In some embodiments, the image is obtained by at least one electromagnetic wave source selected from light, X-rays, microwaves, and radio waves.

In some embodiments, the image is or was obtained by more than imaging device type. For example topographic imageing device combined with a 2D imaging device can be used to construct a 3D image.

In certain embodiments, the invention relates to the method of the invention, wherein the image is or was obtained by optical imaging.

In certain embodiments, the invention relates to the pharmaceutical composition for use of the invention, wherein the image is or was obtained by optical imaging.

In certain embodiments, the invention relates to the method of the invention, or the pharmaceutical composition for use of the invention, wherein the image is or was obtained by using light as a source of light.

The term "optical imaging", as used herein, refers to an imaging technique that uses light as a source of light. In some embodiments, the imaging technique employs at least one technique selected from the group of ballistic photon, diffuse optical imaging, optical coherence tomography, optical tomography, photon diffusion, topographic imageing, LiDAR, 3D imaging and laser doppler imaging.

Images from optical imaging can be labeled particularly accurately by trained clinicians and comprise a large number of data points. This facilitates accuracy and training, e.g., of machine learning techniques.

Accordingly, the invention is at least in part based on the finding that the method of the invention is particularly accurate easy to use with light as a source of light.

In certain embodiments, the invention relates to the method of the invention, wherein the image is or was obtained by using visible light as a source of light.

In certain embodiments, the invention relates to the pharmaceutical composition for use of the invention, wherein the image is or was obtained by using visible light as a source of light.

The term "visible light", as used herein, refers to light with wavelengths primarily in the range from about 380 to about 750 nanometers. In some embodiments, the visible light described herein is light with wavelengths from about 380 to about 750 nanometers. The visible light may be represented on the image by values associated with red, green, and blue (RGB) image contributions; cyan, blue, and magenta values (CMB); hue, saturation, lightness (brightness) (HSL); hue, saturation, and value (HSV); lightness "L", green-magenta "A", and blue-yellow "B" (LAB); or other values such as YCbCr; or Y'CbCr.

The patterns relevant for swelling, atrophy and/or fibrosis are particularly well detectable and processable on images obtained with visible light. Images obtained by using visible light can typically be verified by any subject (e.g. an untrained person). Obvious mistakes during the obtainment of the image can therefore be immediately corrected, thus making the method of the invention more accurate. Obtainment of images using visible light does typically not require specific training, facilitating the use of the method of the invention.

Accordingly, the invention is at least in part based on the finding that the method of the invention is particularly accurate easy to use with visible light as a source of light.

In certain embodiments, the invention relates to the method of the invention, wherein the image is or was obtained by a camera.

In certain embodiments, the invention relates to the pharmaceutical composition for use of the invention, wherein the image is or was obtained by a camera.

The term "camera", as used herein, refers to an optical image capturing device. In some embodiments, the camera described herein is a camera of a portable device such as a laptop, tablet, smartphone or wearable. In some embodiments, the image is or was obtained by more than one camera, e.g. for 3D images.

Accordingly, the invention is at least in part based on the finding that the method of the invention is particularly accurate and/or easy to use with a camera.

In certain embodiments, the invention relates to the method of the invention, wherein obtaining the image comprises using augmented reality or wherein the image was obtained by using augmented reality.

In certain embodiments, the invention relates to the pharmaceutical composition for use of the invention, wherein obtaining the image comprises using augmented reality or wherein the image was obtained by using augmented reality.

The term "augmented reality", as used herein, refers to a technology that superimposes computer-generated information on a user's view of the world or of an image, thus providing virtual enhancement integrated with at least one real-world object.

Augmented reality tools can be used for instructing the patient how to position the hand and the capturing device, e.g. mobile phone. In some embodiments, the virtual enhancement described herein is a text, graphic, and/or audio. This facilitates the use and improves accuracy by reduction of variation in the image obtainment process.

Accordingly, the invention is at least in part based on the finding that the method of the invention is particularly accurate and standardizable when used with augmented reality.

In certain embodiments, the invention relates to the method of the invention, wherein the method further comprises administering to the subject having a score indicative for an active state of arthritis a pharmaceutically effective amount of a pharmaceutical composition for use in the treatment of arthritis.

An "effective amount" of a pharmaceutical composition, refers to an amount effective, at dosages and for periods of time necessary, to achieve the desired therapeutic or prophylactic result. Furthermore, the effective amount may depend on the individual patient's history, age, weight, family history, genetic makeup, stage of myocarditis, the types of preceding or concomitant treatments, if any, and other individual characteristics of the subject to be treated.

The method of the invention can be used to personalize a treatment (e.g., the treatment of arthritis) to fit the individual symptom patterns of a subject.

Accordingly, the invention is at least in part based on the finding that the method of the invention can improve treatment regimens of arthritis.

In certain embodiments, the invention relates to a library of a parameter indicative of the degree of swelling, atrophy and/or fibrosis determined according to the invention.

In certain embodiments, the invention relates to a library of a score indicative of the state of arthritis determined according to the invention.

In certain embodiments, the invention relates to a library of a parameter indicative of the degree of swelling, atrophy and/or fibrosis determined according to the method of the invention.

In certain embodiments, the invention relates to a library of a score indicative of the state of arthritis determined according to the method of the invention.

In certain embodiments, the invention relates to a storage device comprising computer-readable program instructions for executing the method according to the invention.

The term "storage device", as used herein, refers to any tangible device that can retain and store instructions for use by an instruction execution device.

In some embodiments, the storage device described herein is at least one selected from the group of electronic storage device, magnetic storage device, optical storage device, electromagnetic storage device, semiconductor storage device, any suitable combination thereof. A non-exhaustive list of more specific examples of the storage device includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In certain embodiments, the invention relates to a system for determining a parameter indicative of the degree of swelling, atrophy and/or fibrosis determined according to the method of embodiment the invention comprising the storage device according to the invention, at least one processing device, and a capturing device.

The term "processing device", as used herein, refers to any device or device part that can be configured to carry out program code by performing arithmetical, logical, and input/output operations, according to the program code. In some embodiments, the processing device described herein is selected from the group of processor, central at least one processor unit (CPU), controller, arithmetic logic unit (ALU), digital signal processor, microcomputer, microprocessor and graphics processing unit (GPU).

The term "capturing device", as used herein, refers to any device that captures an image. Such image capturing devices include without limitation medical imaging devices, digital cameras, webcams, mobile phone cameras, and tablet cameras. The capturing device may be physically and/or communicatively coupled to a mobile computing device and a display device.

In certain embodiments, the invention relates to a system for determining a score indicative of the state of arthritis determined according to the method of the invention comprising the storage device according to the invention, at least one processing device, and a capturing device.

In certain embodiments, the invention relates to a server comprising the storage device of the invention, at least one processing device, and a network connection for receiving data indicative of an image of a body part.

The term "network connection", as used herein, refers to a communication channel of a data network. A communication channel can allow at least two computing systems to communicate data to one another. In some embodiments, the data network is selected from the group of the internet, a local area network, a wide area network, and a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Therefore, the image can be obtained by a user (e.g., a patient) of a software (e.g., an app) and subsequently sent to the server described herein. In this setup, the resource requirements for the capturing device(s) are low and can be done on a portable device (e.g., a smartphone) without reducing the accuracy of the method of the invention.

"a," "an," and "the" are used herein to refer to one or to more than one (i.e., to at least one, or to one or more) of the grammatical object of the article.

"or" should be understood to mean either one, both, or any combination thereof of the alternatives.

"and/or" should be understood to mean either one, or both of the alternatives.

Throughout this specification, unless the context requires otherwise, the words "comprise", "comprises" and "comprising" will be understood to imply the inclusion of a stated step or element or group of steps or elements but not the exclusion of any other step or element or group of steps or elements.

The terms "include" and "comprise" are used synonymously. "preferably" means one option out of a series of options not excluding other options. "e.g." means one example without restriction to the mentioned example. By "consisting of" is meant including, and limited to, whatever follows the phrase "consisting of."Reference throughout this specification to "one embodiment", "an embodiment", "a particular embodiment", "a related embodiment", "a certain embodiment", "an additional embodiment", "some embodiments", "a specific embodiment" or "a further embodiment" or combinations thereof means that a particular feature, structure or characteristic described in connection with the embodiment is included in at least one embodiment of the present invention. Thus, the appearances of the foregoing phrases in various places throughout this specification are not necessarily all referring to the same embodiment. Furthermore, the particular features, structures, or characteristics may be combined in any suitable manner in one or more embodiments. It is also understood that the positive recitation of a feature in one embodiment, serves as a basis for excluding the feature in a particular embodiment.

The terms "about" or "approximately", as used herein, refer to "within 20%", more preferably "within 10%", and even more preferably "within 5%", of a given value or range.

The invention further relates to the following embodiments

1. A method for determining a parameter indicative of the degree of swelling of a body part of a subject, the method comprising the steps of:
   (I) retrieving an image of a body part of a subject, wherein the body part is capable of swelling;
   (II) determining the contrast of the body part and/or the shape of the body part on the image; and
   (III) classifying the contrast of the body part and/or the shape of the body part on the image of step (II) to determine the parameter indicative of the degree of swelling from the image.
2. The method according to embodiment 1, wherein the contrast of the body part comprises level of contrast, width of contrast lines, length of contrast lines, angle of contrast lines and/or distance between contrast lines.
3. The method according to embodiment 1 or 2, wherein the determination of the parameter indicative of the degree of swelling from the image is further based on a clinical parameter of the subject.
4. The method according to embodiment 4, wherein clinical parameter is at least one parameter selected from the group of age, gender, form of arthritis, body size, body weight, and skin color.
5. A method for determining a score indicative of the state of arthritis from an image of a body part, wherein the method comprises the steps of:
   (i) determining from the image a parameter indicative of the degree of swelling according to any of the embodiments 1 to 4,
   (ii) comparing the parameter determined in (i) to a reference parameter; and
   (iii) identifying a score indicative of the state of arthritis based on the comparison in step (ii), in particular, wherein the score is indicative for an active state of arthritis if the parameter determined in (i) is above the reference parameter in step (ii).
6. A pharmaceutical composition for use in the treatment of arthritis in a subject, wherein the subject has a score indicative for an active state of arthritis determined according to the method of embodiment 5.
7. The method of embodiment 5, or the pharmaceutical composition for use of embodiment 6, wherein the reference parameter is a parameter
   (a) obtained from prior analysis of said subject, or
   (b) obtained from at least one reference subject, wherein the at least one reference subject is a subject not suffering from arthritis and/or from swelling of the body part, and/or is a subject suffering from arthritis and/or from swelling of the body part.
8. The method of embodiment 5 or 7, or the pharmaceutical composition for use of embodiment 6 or 7, wherein a decrease of the parameter compared to the reference parameter indicates that arthritis deteriorates, wherein an increase of the parameter compared to the reference parameter indicates that arthritis ameliorates, or wherein an identical parameter compared to the reference parameter indicates that arthritis halts.
9. The method of any one of embodiments 5, 7, and 8, or the pharmaceutical composition for use of any one of embodiments 6 to 8, wherein the reference parameter is a library of reference parameters, preferably wherein the library is generated by machine learning, more preferably wherein the library is generated by a technique selected from the group of deep learning, convolutional networks, decision trees, and fuzzy nets.
10. The method of any one of embodiments 5, 7 to 9, or the pharmaceutical composition for use of any one of embodiments 6 to 9, wherein the comparison step comprises automated feature learning and classification steps.
11. The method of any one of embodiments 5, 7 to 10, or the pharmaceutical composition for use of any one of embodiments 6 to 10, wherein the state of arthritis comprises an inflammation grade and/or synovitis grade.
12. The method of any one of embodiments 1 to 5, 7 to 11, or the pharmaceutical composition for use of any one of embodiments 6 to 11, wherein the body part is a hand and/or a foot of a subject.
13. The method of embodiment 12 or the pharmaceutical composition for use of embodiment 12, wherein the body part is a hand of the subject.
14. The method of any one of embodiments 1 to 5, 7 to 13, or the pharmaceutical composition for use of any one of embodiments 6 to 13, wherein the body part comprises a proximal interphalangeal joint, an extensor tendon, a metacarpophalangeal joint, and/or a distal interphalangeal joint.
15. The method of any one of embodiments 1 to 5, 7 to 14, or the pharmaceutical composition for use of any one of embodiments 6 to 14, wherein the body part comprises dorsal finger skin folds of the proximal interphalangeal joint, a skin fold of the extensor tendon, and/or the metacarpophalangeal joints.
16. The method of any one of embodiments 1 to 5, 7 to 15, or the pharmaceutical composition for use of any one of embodiments 6 to 15, wherein the parameter is the shape of the skin folds, the contrast of the skin folds, the number of the skin folds, the length or thickness of the skin folds, the angle of skin folds, the distance between skin folds and/or the contour of the body part.
17. The method of any one of embodiments 1 to 5, 7 to 16, or the pharmaceutical composition for use of any one of embodiments 6 to 16, wherein the parameter is
   (a) the shape of the dorsal finger skin folds of the proximal interphalangeal joint,
   (b) the contrast of the dorsal finger skin folds of the proximal interphalangeal joint,
   (c) the contrast of the extensor tendon, and/or
   (d) the contour of the metacarpophalangeal relief.
18. The method of any one of embodiments 1 to 5, 7 to 17, or the pharmaceutical composition for use of any one of embodiments 6 to 17, wherein the parameter indicates whether arthritis ameliorates, halts, or deteriorates.
19. The method of any one of embodiments 1 to 5, 7 to 18, or the pharmaceutical composition for use of any one of embodiments 6 to 18, wherein the shape of the dorsal finger skin folds of the proximal interphalangeal joint, the contrast of the dorsal finger skin folds of the proximal interphalangeal joint, the contrast of the extensor tendon, and/or the contour of the metacarpophalangeal relief is/are determined.
20. The method of any one of embodiments 5, 7 to 19, or the pharmaceutical composition for use of any one of embodiments 6 to 19, wherein the arthritis is selected from the group consisting of osteoarthritis, rheumatoid arthritis, gout, pseudo-gout, septic arthritis, psoriasis arthritis, spondyloarthritis, juvenile idiopathic arthritis, crystal-associated arthritis and still's disease, preferably wherein the arthritis is rheumatoid arthritis.
21. The method of any one of embodiments 5, 7 to 20, or the pharmaceutical composition for use of any one of embodiments 6 to 20, wherein the body part is the distal interphalangeal joint, and wherein the arthritis is osteoarthritis.

22. The method of any one of embodiments 1 to 5 and 7 to 21, wherein the method further comprises obtaining the image of the body part.

23. The method of any one of embodiments 1 to 5 and 7 to 22, or the pharmaceutical composition for use of any one of embodiments 6 to 21, wherein the image is or was obtained by optical imaging, preferably using light as a source of light, wherein preferably the light is visible light.

24. The method of any one of embodiments 1 to 5 7 to 23, or the pharmaceutical composition for use of any one of embodiments 6 to 21, 23, wherein the image is or was obtained by a camera.

25. The method of any one of embodiments 1 to 5, 7 to 24, or the pharmaceutical composition for use of any one of embodiments 6 to 11, 23, 24, wherein obtaining the image comprises using augmented reality or wherein the image was obtained by using augmented reality.

26. The method of any one of embodiments 5, 7 to 25, wherein the method further comprises administering to the subject having a score indicative for an active state of arthritis a pharmaceutically effective amount of a pharmaceutical composition for the treatment of arthritis.

27. A library of a parameter indicative of the degree of swelling determined according to the method of embodiment 1 to 4, 12 to 25 or of a score indicative of the state of arthritis determined according to the method of embodiment 5, 7 to 26.

28. A storage device comprising computer-readable program instructions for executing the method according to embodiment 1 to 5, 7 to 25.

29. A system for determining a parameter indicative of the degree of swelling determined according to the method of embodiment 1 to 4, 12 to 25 or for determining a score indicative of the state of arthritis determined according to the method of embodiment 5, 7 to 26 comprising the storage device according to embodiment 28; at least one processing device and a capturing device.

30. A server comprising the storage device of embodiment 29, at least one processing device, and a network connection for receiving data indicative of an image of a body part.

Unless otherwise defined, all technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

The general methods and techniques described herein may be performed according to conventional methods well known in the art and as described in various general and more specific references that are cited and discussed throughout the present specification unless otherwise indicated.

While aspects of the invention are illustrated and described in detail in the figures and foregoing description, such illustration and description are to be considered illustrative or exemplary and not restrictive. It will be understood that changes and modifications may be made by those of ordinary skill within the scope and spirit of the following claims. In particular, the present invention covers further embodiments with any combination of features from different embodiments described above and below.

Although the foregoing invention has been described in some detail by way of illustration and example for purposes of clarity of understanding, it will be obvious that certain changes and modifications may be practiced within the scope of the appended claims.

EXAMPLES

Example 1

Figure 1:
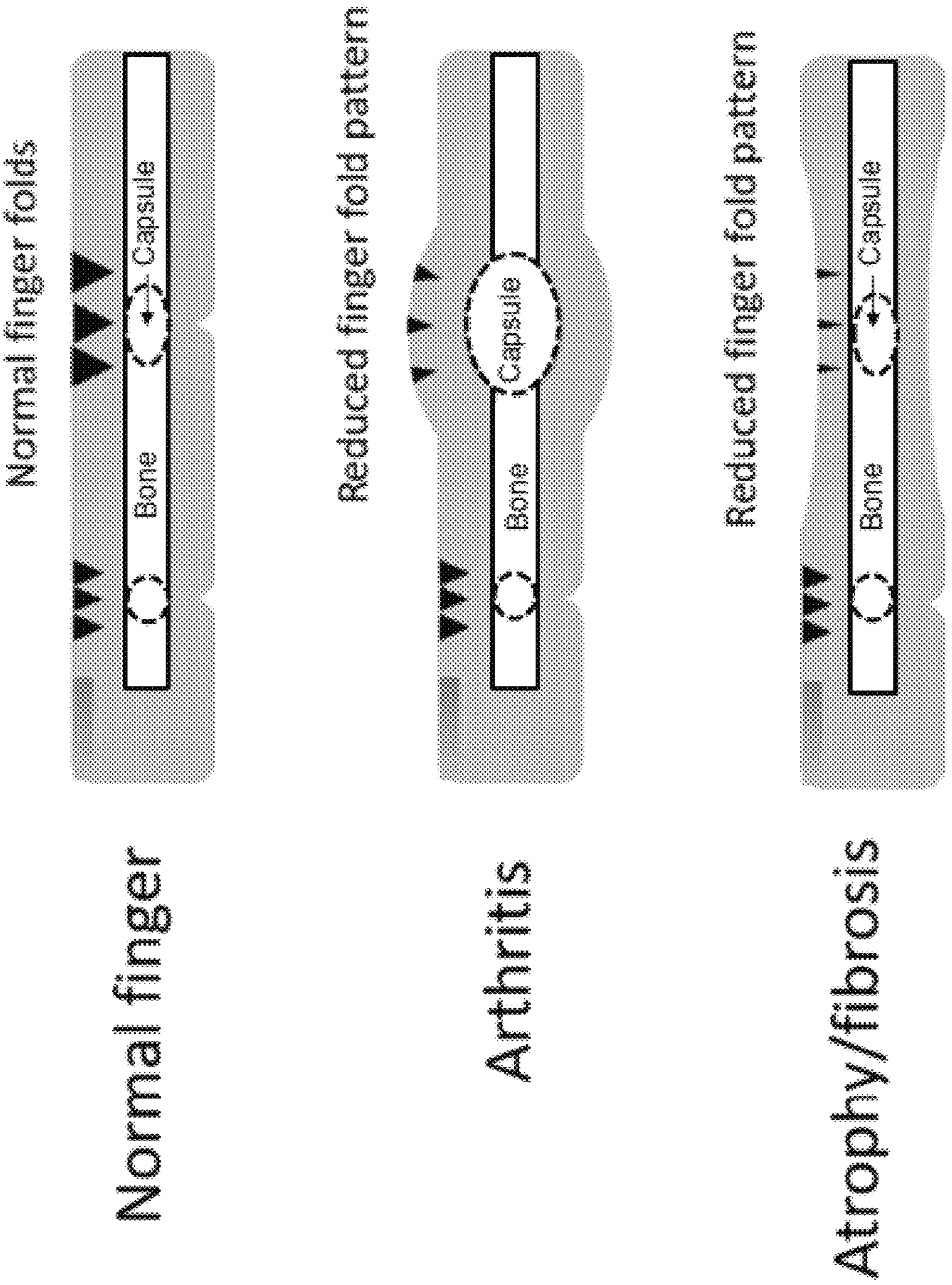
FIG. 1 Schematic representation of altered finger fold patterns
Figure 2:
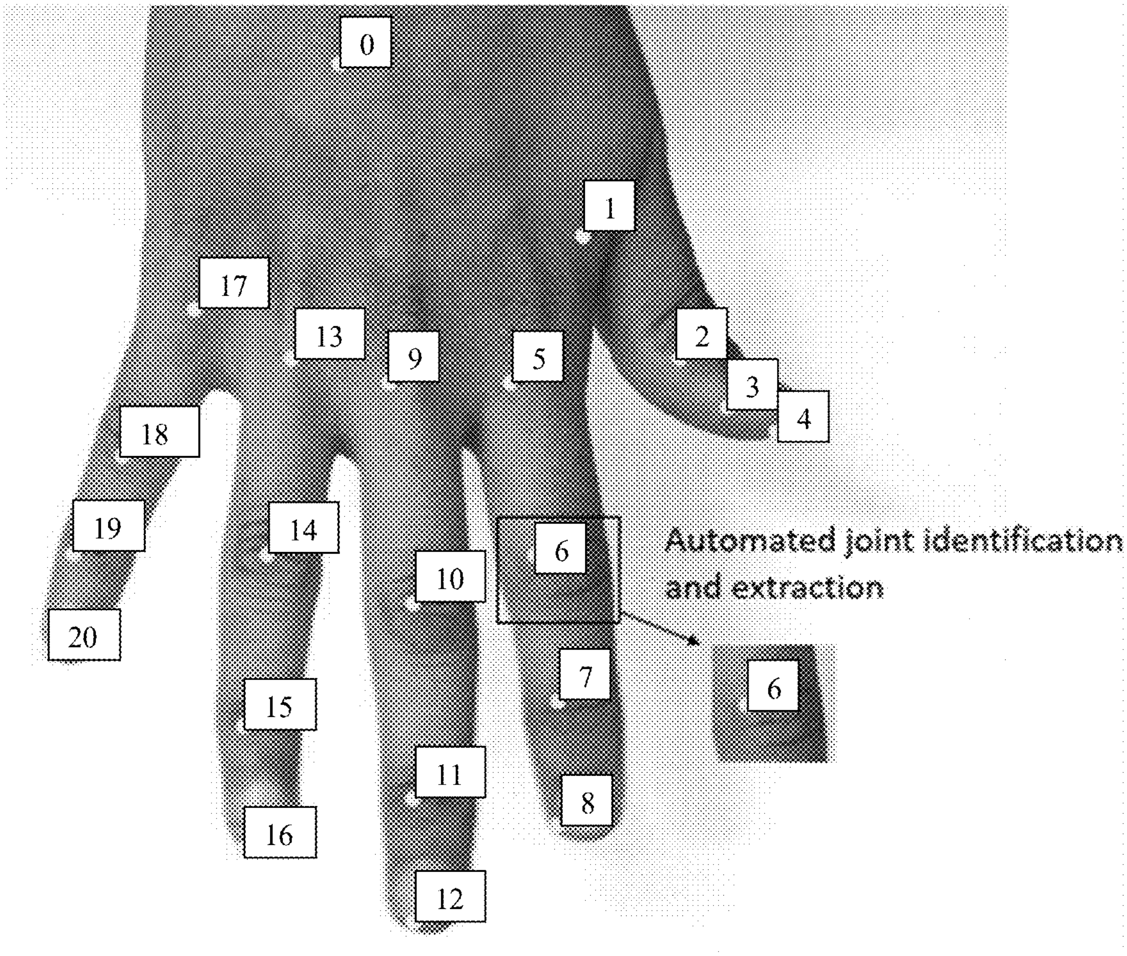
FIG. 2 Automated joint identification and extraction
Figure 3:
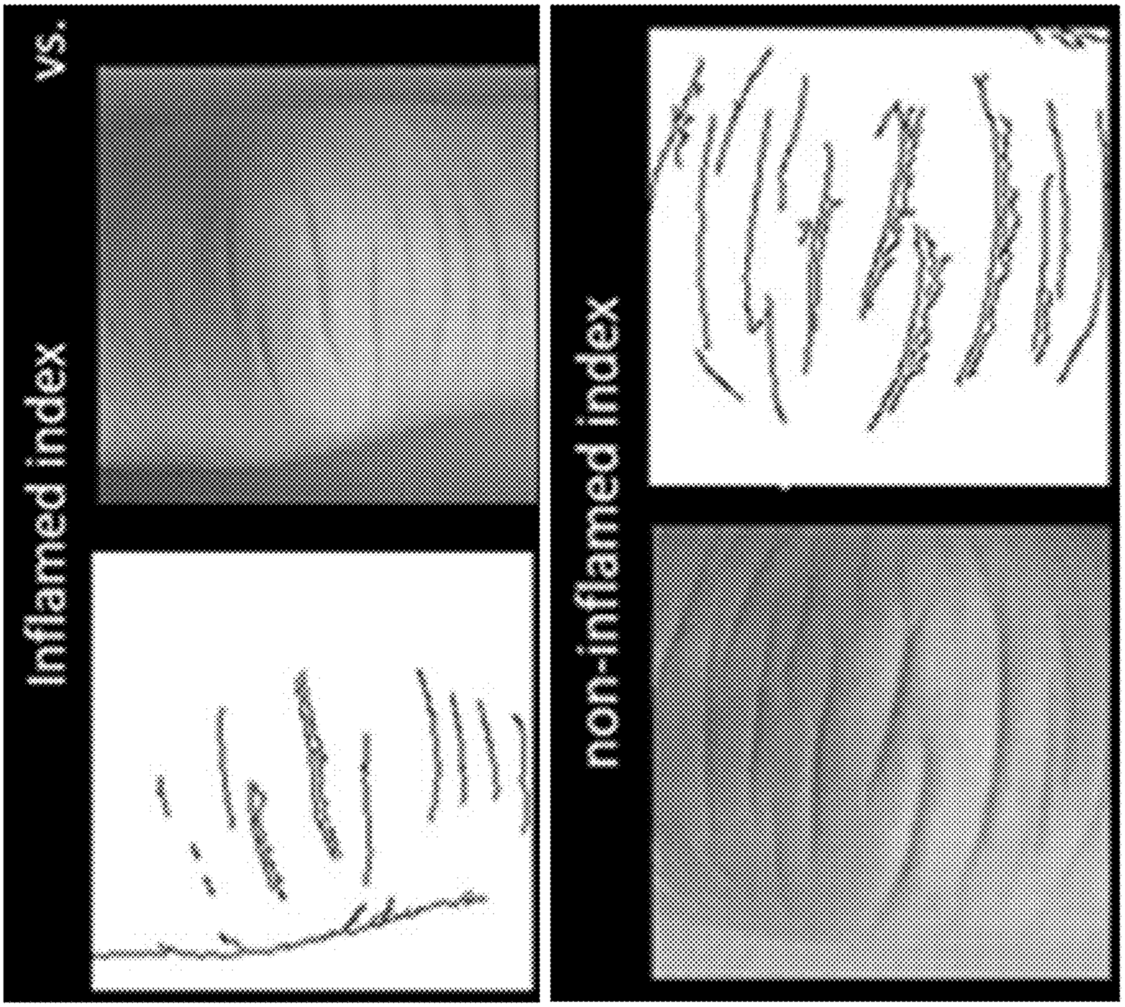
FIG. 3 Automated recognition of deep finger folds
Figure 4:
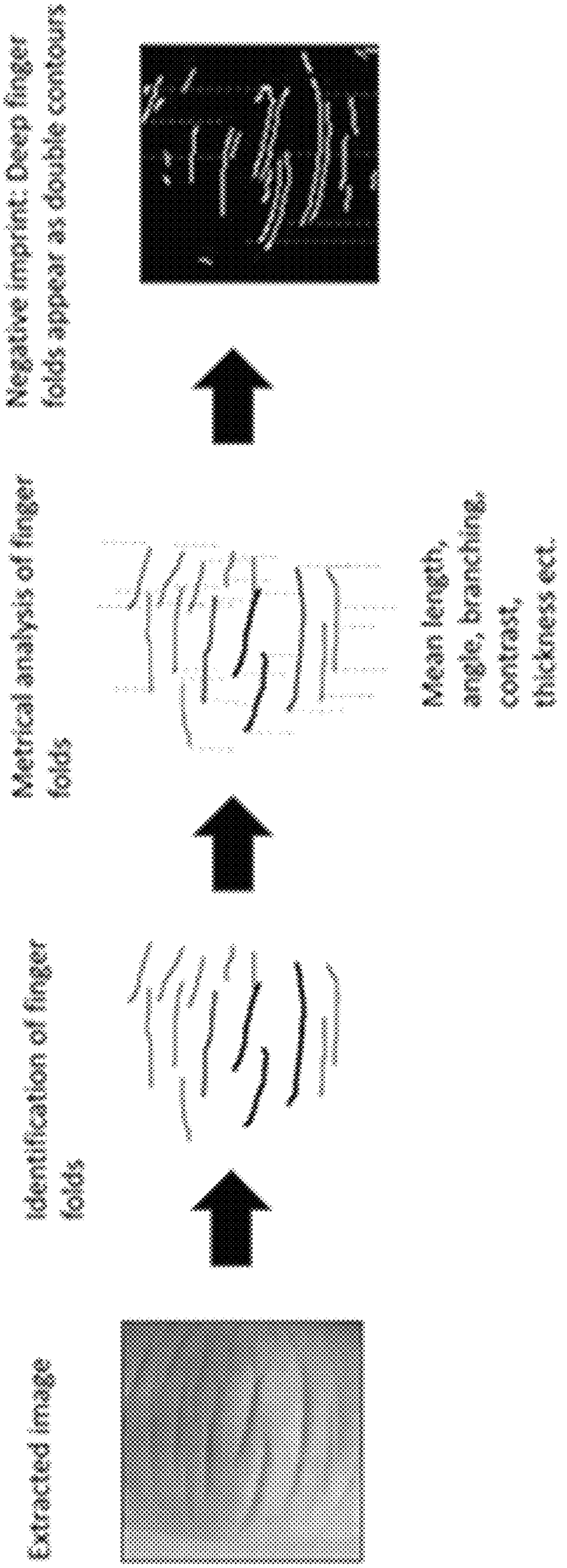
FIG. 4 Schematic illustration of image processing
Figure 5:
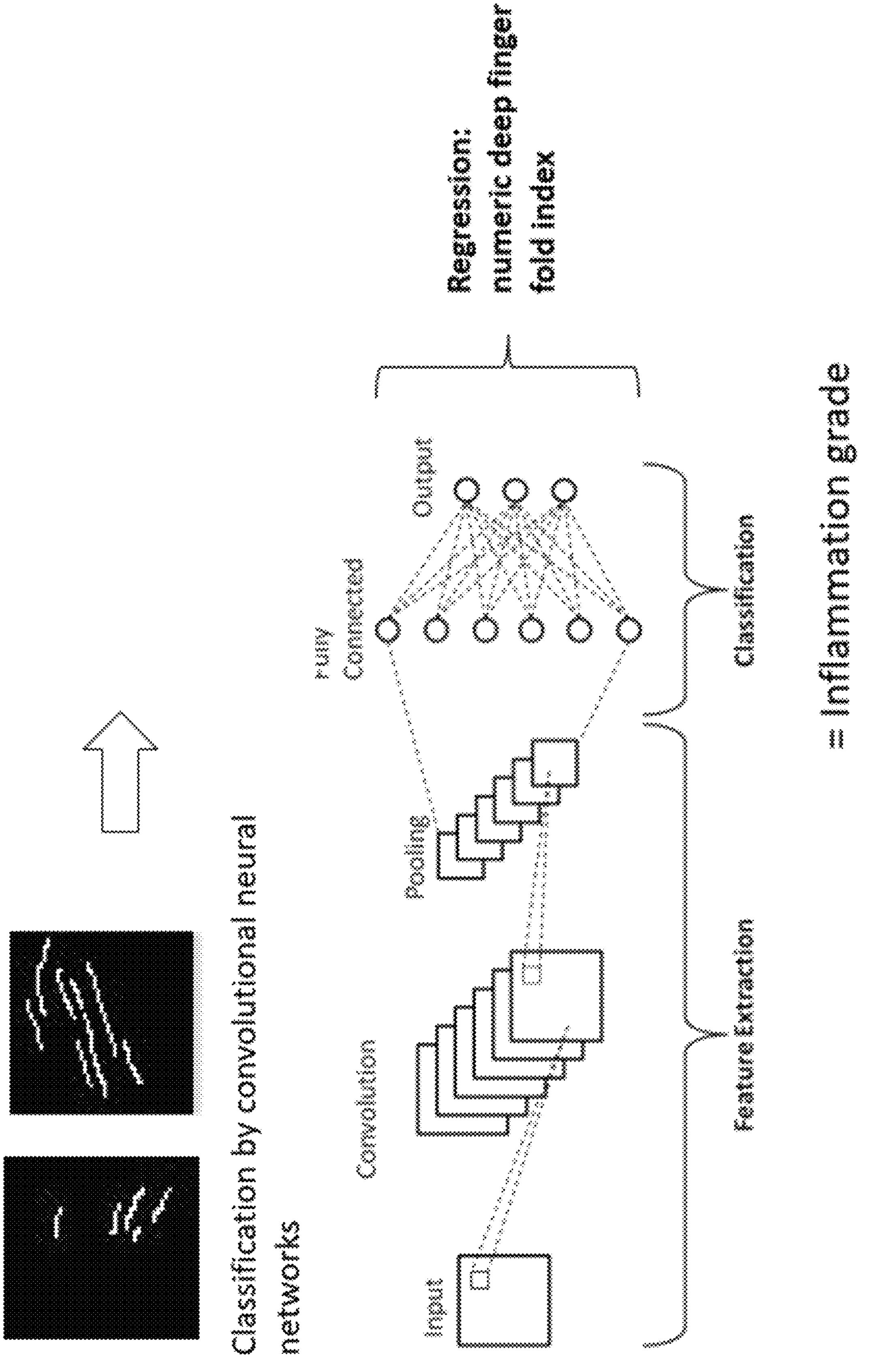
FIG. 5 Schematic illustration of machine learning steps

Image Processing was Done in Python Using Using the Packages Cv2, Time, Numpy, Glob, Pandas and Os Automated finger joint recognition on hand photographs:

The image of the hand was segmented by Python in a 20 point structure. The joints of the hand were detected (FIG. 2) and extracted based on the 20 point structure.

Extraction of Hand Contour Lines of a Hand Photo

Extraction of the hand contour lines was done using python comprising the following steps:

Find contours in edges, sort by area

Create empty mask, draw filled polygon on it corresponding to largest contour

Smooth mask, then blur mask

Blend masked img into MASK_COLOR background detect palmlines detect lines

Figure 8A:
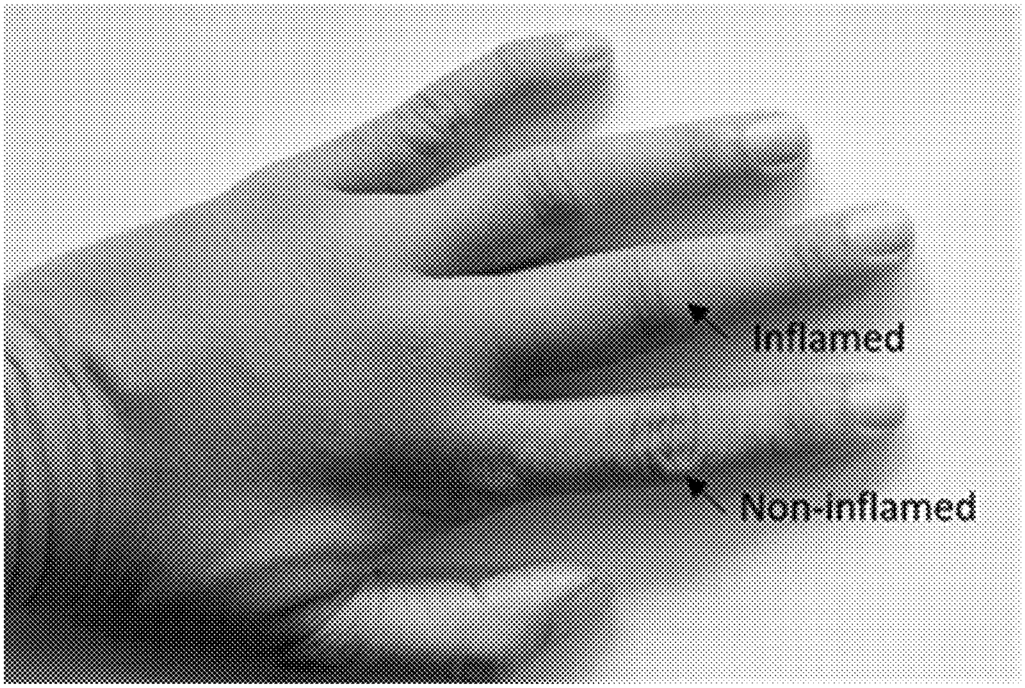
FIGS. 8A-C Extraction of hand contour lines of a hand photo by phyton. (A) input image; (B) fold recognition image (C) joint detection FIG. 9 Confusion matrix showing the number of correctly and incorrectly classified images for each class on the validation dataset FIG. 10 metrical analysis of representative finger fold lengths was calculated by the ratio of maximal PIP joint diameter.
Figure 8B:
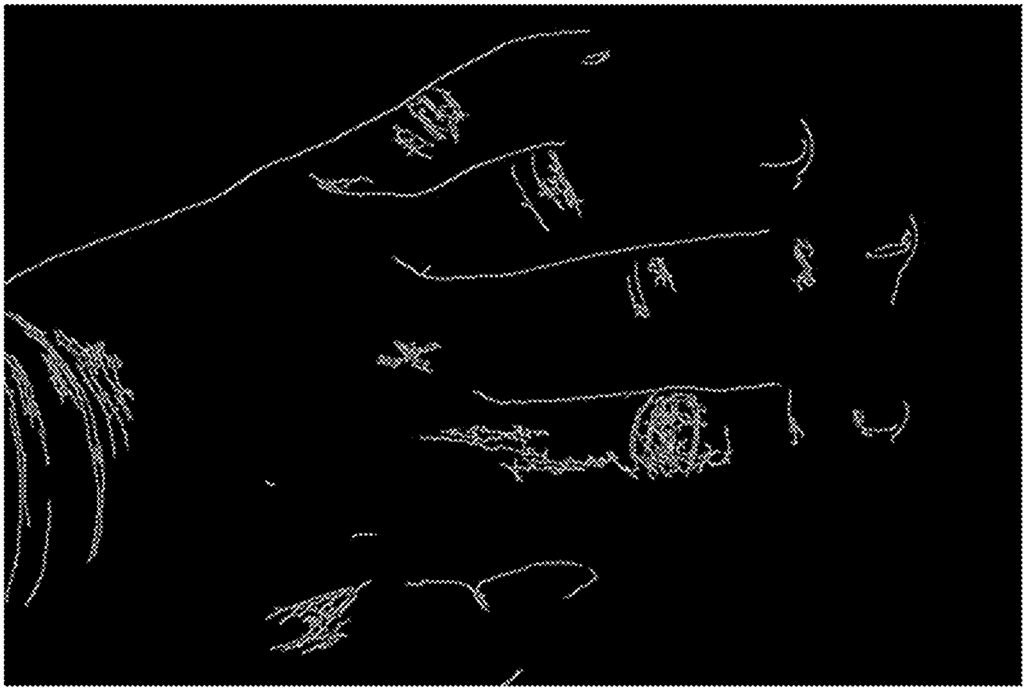
Figure 8C:
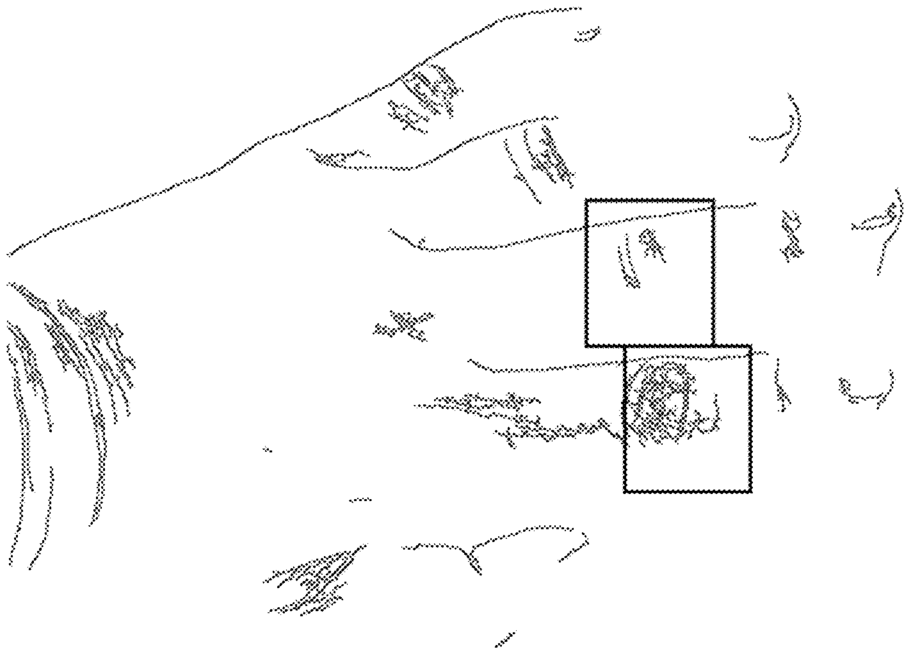

An example input image is illustrated in FIG. 8A; an example output image is illustrated in FIGS. 8B-C.

In a second step, automated metric analyses of finger folds can be performed such as mean length, angle, branching, contrast, thickness ect.

For this example hand photographs were used. In a first step, the python code automatically identifies and extracts proximal interphalangeal finger joints (PIP). From this images, dorsal finger folds are extracted in a second step. The dorsal finger fold pattern can now be compared to previous images of the same individual or classified into inflamed yes/no or inflammation grades. For the latter, visual patterns of dorsal finger folds or metric analyses can be used.

Example 2 Machine Learning

Image Classification task of extracted contour lines of inflamed versus non-inflamed proximal interphalangeal joints in patients with rheumatoid arthritis:

Image classification task on the handlines dataset, comprised of 190 images with 2 classes. Architecture CNN, base model resnet34, size 87.25 MB. Max. epochs 30.
Training, Validation Dataset Info

| dataset | total samples | split % | size |
|---|---|---|---|
| training dataset | 152 | 80.0 | 397.62 KB |
| validation dataset | 38 | 20.0 | 99.41 KB |
| total | 190 | 100.0 | 497.03 KB |

Model:

| Metrics | Score |
|---|---|
| Accuracy | 0.84 |
| Error Rate | 0.16 |
| Auroc Inflammed | 0.83 |
| Auroc Non inflammed | 0.83 |

Figure 9:
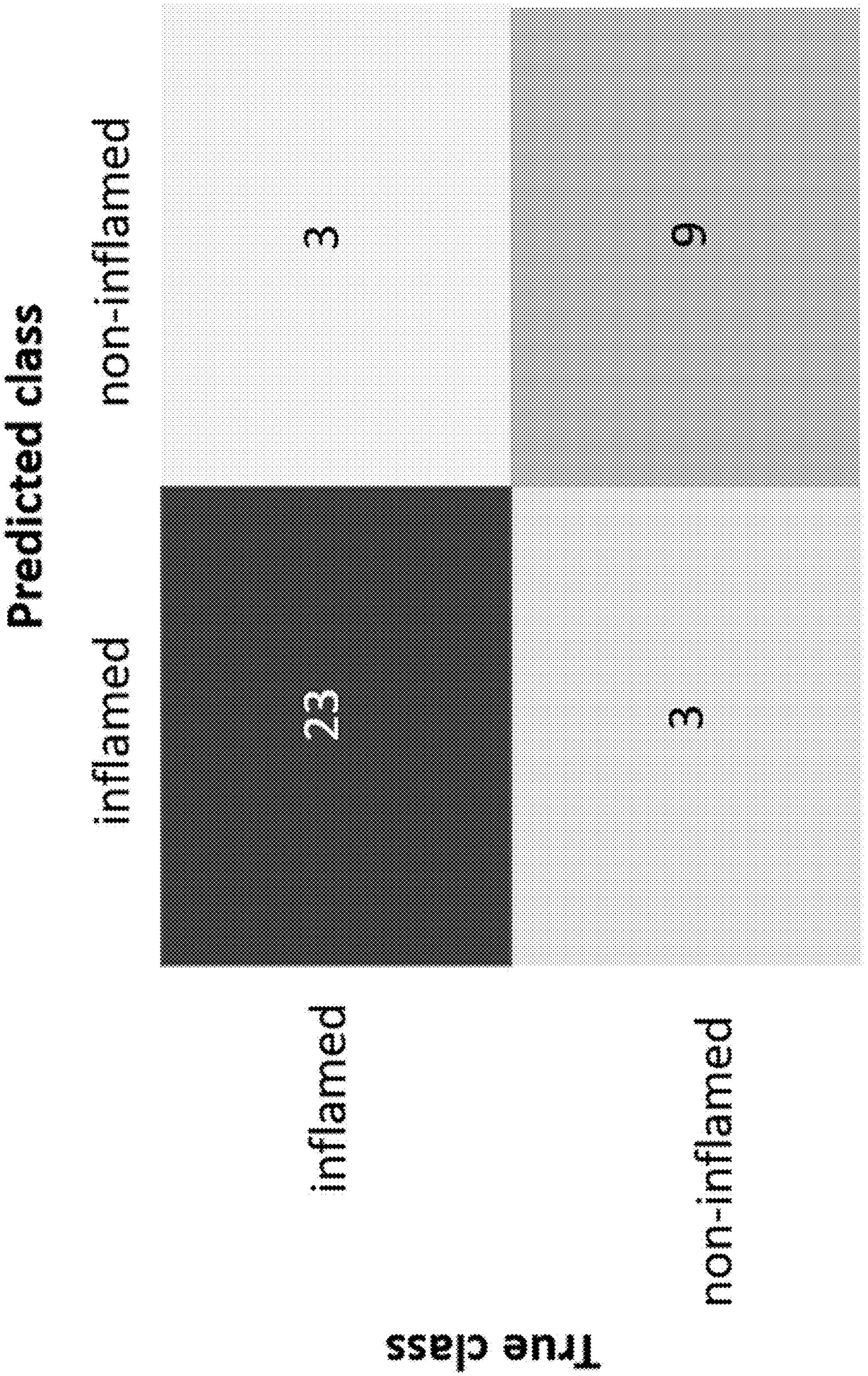
Figure 10:
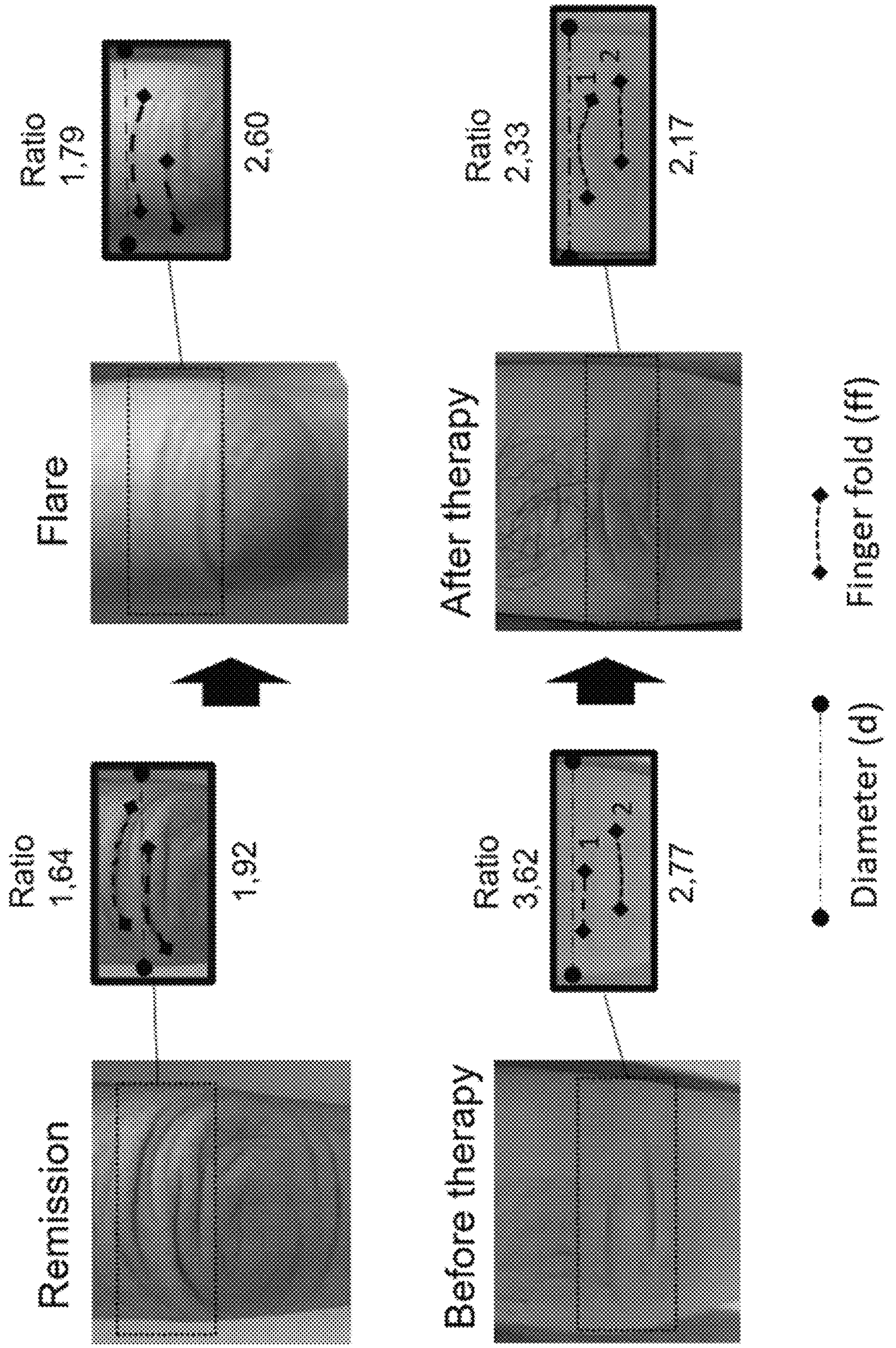
Figure 11:
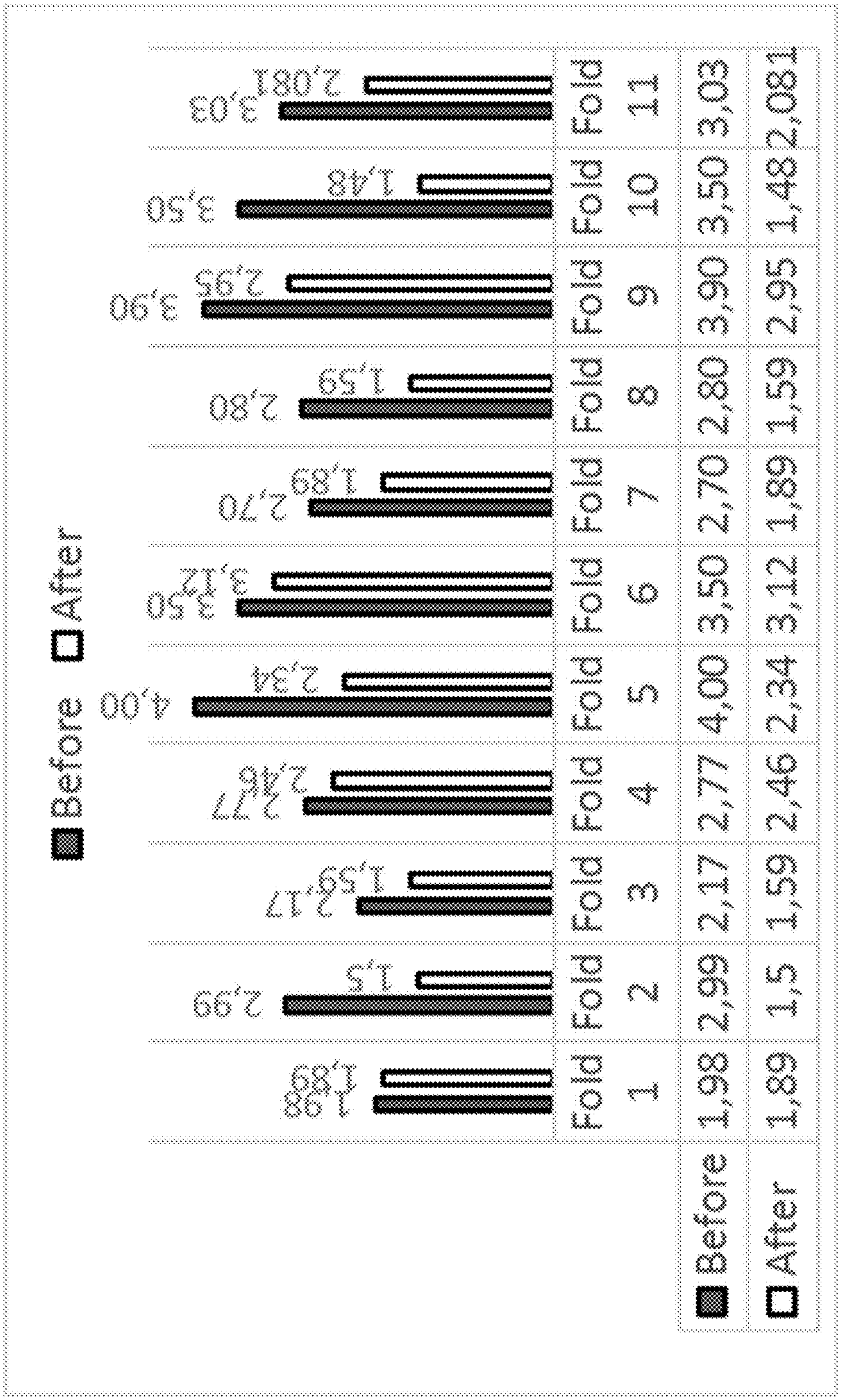
FIG. 11 Finger fold index=(d/ff): In patients with significant clinical response to treatment and change in the finger fold index (FFI) can be observed.

Prediction: FIG. 9

Example 3 Recognition of Hand Knuckles Contour

Figure 6:
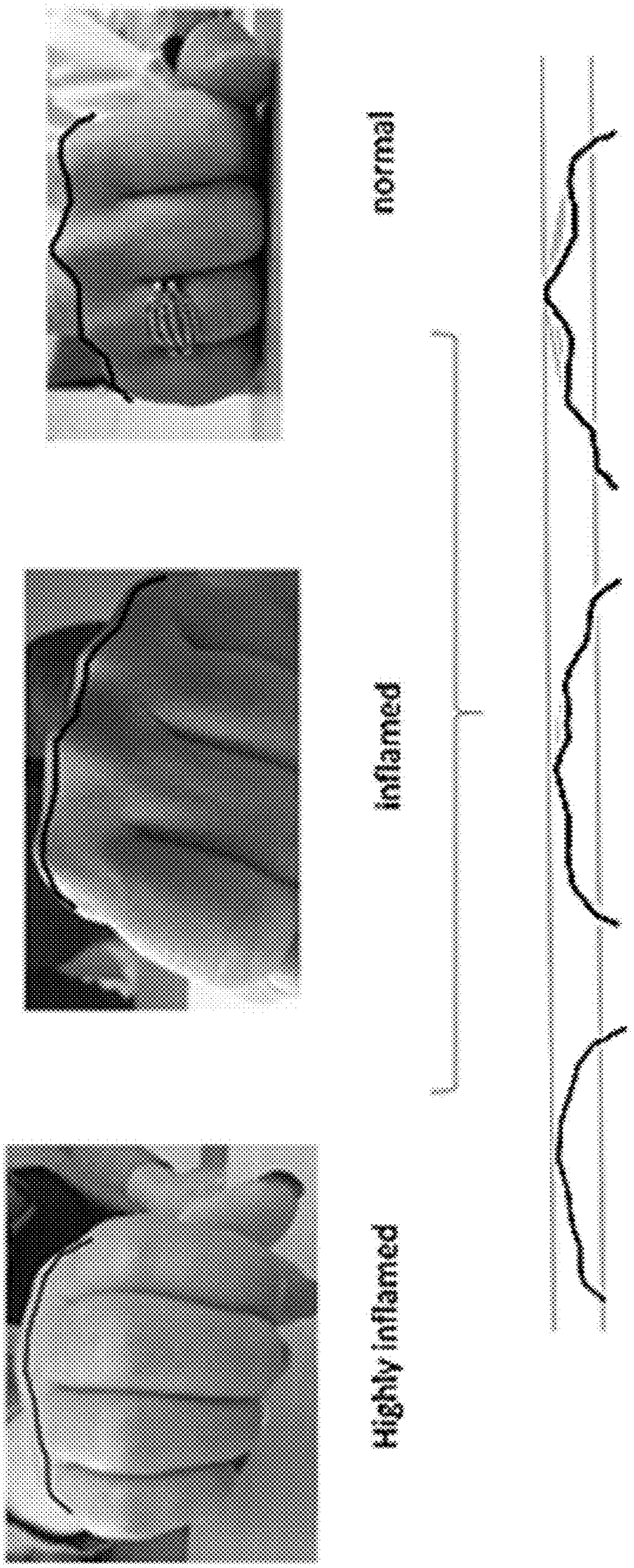
FIG. 6 Automated recognition of hand knuckles contour

The hand knuckles contour is detected using contrast and edge detection on the image in python. Example images are illustrated in FIG. 6.

Example 4 Recognition of Extensor Tendon Contour

Figure 7:
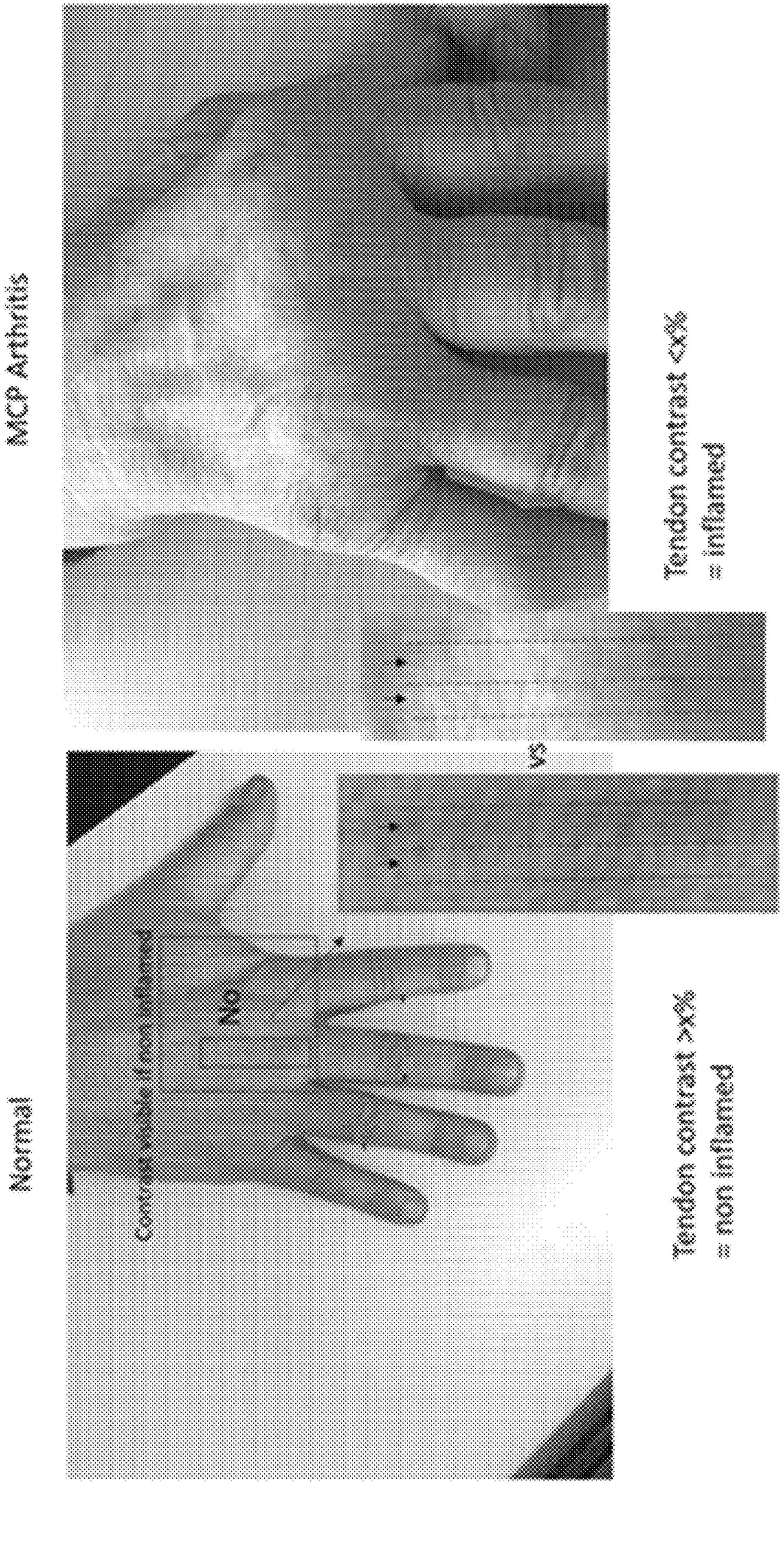
FIG. 7 Automated recognition of extensor tendon contour

The extensor tendon contour is detected using contrast and edge detection on the image in python. Example images are illustrated in FIG. 7.

Example 5 Finger Fold Index as a Biomarker

152 PIP joints of patients with RA according to the EULAR/ACR criteria were labelled into the presence or absence of joint swelling by clinical judgement and ultrasound. Hand photographs were taken during consultations by mobile phone cameras in a standardized manner (single hand, no direct light, 15 cm distance, lineal). For preprocessing, dorsal finger folds from PIP joints were automatically recognized and extracted from hand photographs by a pipeline consisting of an open-source hand keypoint detection, contrast limited adaptive histogram equalization and Canny edge detection (Hand Keypoint Detection using Deep Learning and OpenCV|LearnOpenCV).

In swollen joints, the number of skin fold imprints was significantly reduced compared to non-swollen joints (1.3, SD 0.8 vs. 3.3, SD 0.49). The fold length/diameter ratio (=finger fold index, FFI) was also significantly higher in swollen (6.2, SD 3.3) versus non-swollen joints (2.15 SD 0.6). Finger folds in swollen joints were less curved than in non-swollen joints.

A convolutional neural network model was trained for classification into swollen versus non-swollen joints dividing the images in a training (80%, 152 images) and a validation set (20%, 38 images) on an open access platform (www.giotto.ai). The network architecture was resnet34 with an additional fully connected layer 1000->2, trained with cross-entropy loss with constant learning rate of 0.001 and for 20.

The model successfully differentiated swollen from non-swollen joints based on finger fold patterns with a validation accuracy of 0.84. Main reasons for misinterpreted images were hairy skin or oblique finger positioning. A heatmap of the original images obtained by an extraction algorithm confirmed finger folds as key features for the correct classification.

Next, we metrically compared 10 representative finger folds with joints with clinically judged improvement of joint swelling after therapy (corticoids and/or DMARDs). The FFI differed significantly before (0.38) and after (0.53) therapy ($p<0.05$). Curving reappeared in some skin folds after therapy.

In conclusion, the automated dorsal finger fold recognition is a digital biomarker for joint swelling, e.g., in RA.

The invention claimed is:

1. A method for determining a parameter indicative of the degree of swelling and/or atrophy of a body part of a subject, the method comprising the steps of:

(I) retrieving an image of a body part of a subject, wherein the body part is capable of swelling and/or atrophy;

(II) determining a contrast of shadow on a skin of the body part on the image and/or an edge line of the body part on the image; and (III) classifying the contrast of shadow on the skin of the body part on the image and/or the edge line of the body part on the image of step (II) to determine the parameter indicative of the degree of swelling and/or atrophy from the image;

wherein the determination of the parameter indicative of the degree of swelling, and/or atrophy from the image is further based on a clinical parameter of the subject, wherein the clinical parameter is at least one parameter selected from the group of: age, gender, form of arthritis, grade of arthritis, form of scleroderma, grade of scleroderma, grade of Raynaud's phenomenon, type of Raynaud's phenomenon, body size, body weight, and skin color.

2. The method according to claim 1, wherein the contrast of shadow on the skin of the body part on the image comprises level of contrast, width of contrast lines, length of contrast lines, angle of contrast lines and/or distance between contrast lines.

3. A method for determining a score indicative of the state of arthritis, scleroderma and/or Raynaud's phenomenon from an image of a body part of a subject, wherein the method comprises the steps of:

(i) determining from the image a parameter indicative of the degree of swelling and/or atrophy according to claim 1, (ii) comparing the parameter determined in (i) to a reference parameter; and (iii) identifying a score indicative of the state of arthritis based on the comparison in step (ii), in particular, wherein the score is indicative for an active state of arthritis, scleroderma and/or Raynaud's phenomenon if the parameter determined in (i) is above the reference parameter in step (ii).

4. The method of claim 3, wherein the reference parameter is a parameter (a) obtained from prior analysis of said subject, or (b) obtained from at least two reference subjects, wherein the at least one reference subject is not suffering from arthritis scleroderma and/or Raynaud's phenomenon, and/or from swelling, and/or atrophy of the body part, and at least one reference subject is suffering from arthritis scleroderma and/or Raynaud's phenomenon and/or from swelling and/or atrophy of the body part.

5. The method of claim 3 wherein a decrease of the parameter compared to the reference parameter indicates that arthritis, scleroderma and/or Raynaud's phenomenon deteriorates, wherein an increase of the parameter compared to the reference parameter indicates that arthritis, scleroderma and/or Raynaud's phenomenon ameliorates, or wherein an identical parameter compared to the reference parameter indicates that arthritis, scleroderma and/or Raynaud's phenomenon halts.

6. The method of claim 3, wherein the reference parameter is a library of reference parameters, preferably wherein the library is generated by machine learning, more preferably wherein the library is generated by a technique selected from the group of deep learning, convolutional networks, decision trees, and fuzzy nets.

7. The method of claim 3, wherein the comparison step comprises automated feature learning and classification steps.

8. The method of claim 3, wherein the state of arthritis comprises an inflammation grade and/or synovitis grade.

9. The method of claim 1, wherein the body part is a hand and/or a foot of a subject.

10. The method of claim 9, wherein the body part is a hand of the subject.

11. The method of claim 1, wherein the body part comprises a proximal interphalangeal joint, an extensor tendon, a metacarpophalangeal joint, and/or a distal interphalangeal joint.

12. The method of claim 1, wherein the body part comprises dorsal finger skin folds of the proximal interphalangeal joint, a skin fold of the extensor tendon, and/or the metacarpophalangeal joints.

13. The method of claim 1, wherein the parameter is the shape of the skin folds, the contrast of the skin folds, the number of the skin folds, the length or thickness of the skin folds, the angle of skin folds, the distance between skin folds and/or the contour of the body part.

14. The method of claim 1, wherein the parameter is (a) the edge line of the dorsal finger skin folds of the proximal interphalangeal joint, (b) the contrast of shadow of the dorsal finger skin folds of the proximal interphalangeal joint, (c) the contrast of the shadow of extensor tendon, and/or (d) the contour of the metacarpophalangeal relief.

15. The method of claim 1, wherein the parameter indicates whether arthritis ameliorates, halts, or deteriorates.

16. The method of claim 1, wherein the edge line of the dorsal finger skin folds of the proximal interphalangeal joint, the contrast of the shadow of dorsal finger skin folds of the proximal interphalangeal joint, the contrast of shadow of the extensor tendon, and/or the contour of the metacarpophalangeal relief is/are determined.

17. The method of claim 3, wherein the arthritis is selected from the group consisting of osteoarthritis, rheumatoid arthritis, gout, pseudo-gout, septic arthritis, psoriasis arthritis, spondylarthrites, juvenile idiopathic arthritis, crystal-associated arthritis and still's disease, preferably wherein the arthritis is rheumatoid arthritis.

18. The method of claim 3, wherein the body part is the distal interphalangeal joint, and wherein the arthritis is osteoarthritis.

19. The method of claim 1, wherein the method further comprises obtaining the image of the body part.

20. The method of claim 1, wherein the image is or was obtained by optical imaging, preferably using light as a source of light, wherein preferably the light is visible light.

21. The method of claim 1, wherein the image is or was obtained by a camera.

22. The method of claim 1, wherein obtaining the image comprises using augmented reality or wherein the image was obtained by using augmented reality.

23. The method of claim 3, wherein the method further comprises administering to the subject having a score indicative for an active state of arthritis, scleroderma and/or Raynaud's phenomenon a pharmaceutically effective amount of a pharmaceutical composition for the treatment of the respective disease.

24. A library of a parameter indicative of the degree of swelling and/or atrophy determined according to the method of claim 1.

25. A storage device comprising computer-readable program instructions for executing the method according to claim 1.

26. A system for determining a parameter indicative of the degree of swelling, and/or atrophy determined according to the method of claim 1 comprising the storage device according to claim 25; at least one processing device and a capturing device.

27. A server comprising the storage device of claim 26, at least one processing device, and a network connection for receiving data indicative of an image of a body part.

28. The method of claim 3, wherein the score is indicative of the state of arthritis and wherein the parameter is at least indicative of the degree of swelling, preferably wherein the parameter is indicative of the degree of swelling.

29. The method of claim 3, wherein the score is indicative of the state of scleroderma.

30. The method of claim 3, wherein the score is indicative of the state of Raynaud's phenomenon.

31. A method for determining a score indicative of the likelihood of a subject of having arthritis, scleroderma or Raynaud's phenomenon from an image of a body part, wherein the method comprises the steps of:

(i) determining from an image of a body part of a subject a parameter indicative of the degree of swelling and/or atrophy according to claim 1, (ii) comparing the parameter determined in (i) to a distinguishing reference pattern, wherein the distinguishing reference pattern is obtained from at least three reference subjects, wherein at least one reference subject has arthritis, at least one reference subject has scleroderma and at least one reference subject has Raynaud's phenomenon; and (iii) identifying a score indicative of the likelihood of the subject of having arthritis, scleroderma or Raynaud's phenomenon based on the comparison in step (ii).

* * * * *